US012637973B2

(12) United States Patent
Isono et al.

(10) Patent No.: US 12,637,973 B2
(45) Date of Patent: May 26, 2026

(54) RECIPROCATING INTERNAL COMBUSTION ENGINE

(71) Applicant: AISIN CORPORATION, Kariya (JP)

(72) Inventors: Hiroshi Isono, Kariya (JP); Takeshi Hashizume, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/983,647

(22) Filed: Dec. 17, 2024

(65) Prior Publication Data

US 2025/0198327 A1      Jun. 19, 2025

(30) Foreign Application Priority Data

| Dec. 18, 2023 | (JP) | ................................. 2023-212882 |
|---|---|---|
| May 10, 2024 | (JP) | ................................. 2024-077212 |
| Jul. 24, 2024 | (JP) | ................................. 2024-118566 |
| Nov. 27, 2024 | (JP) | ................................. 2024-206540 |

(51) Int. Cl.
| *F02B 75/32* | (2006.01) |
|---|---|
| *F02B 53/00* | (2006.01) |
| *F16H 1/28* | (2006.01) |
| *F16H 57/08* | (2006.01) |

(52) U.S. Cl.
CPC .............. *F02B 75/32* (2013.01); *F02B 53/00* (2013.01); *F16H 1/28* (2013.01); *F16H 57/082* (2013.01)

(58) Field of Classification Search
CPC .......... F16H 57/082; F16H 1/28; F02B 53/00; F02B 75/32
See application file for complete search history.

(56) References Cited

U.S. PATENT DOCUMENTS

| 4,395,880 | A | * | 8/1983 | Berchowitz | ............. | F02G 1/044 |
|---|---|---|---|---|---|---|
| | | | | | | 74/401 |
| 5,482,015 | A | * | 1/1996 | Fish | ........................ | F16H 21/30 |
| | | | | | | 123/197.4 |
| 8,757,126 | B2 | * | 6/2014 | Sullivan, IV | .......... | F02B 75/32 |
| | | | | | | 123/197.1 |
| 2018/0163623 | A1 | * | 6/2018 | Sokalski | ................. | F01B 9/042 |
| 2023/0383692 | A1 | * | 11/2023 | Ardezzone | .............. | F02B 75/32 |

FOREIGN PATENT DOCUMENTS

| EP | 0 708 274 A1 | 4/1996 |
|---|---|---|
| JP | 09-119301 A | 5/1997 |

* cited by examiner

*Primary Examiner* — Kevin A Lathers
(74) *Attorney, Agent, or Firm* — Sughrue Mion, PLLC

(57)                    ABSTRACT

A reciprocating internal combustion engine including a planetary gear mechanism including a ring gear, a carrier rotatably supported with respect to the ring gear, and a planetary gear rotatably supported with respect to the carrier and meshes with the ring gear; a crank member coupled to rotate integrally with the planetary gear; a piston member coupled to the crank member to be relatively rotatable about an input axis set separately from the planetary axis; and a transmission mechanism transmitting a rotation of the carrier to an output member. The crank member includes a pair of crank portions disposed separately on both sides of the carrier in the axial direction, the piston member includes a piston body and a pair of coupling portions disposed separately on both sides of the carrier axially, the first crank portion and the second crank portion are disposed to extend in the planetary radial direction.

12 Claims, 17 Drawing Sheets

FIG.15

RECIPROCATING INTERNAL COMBUSTION ENGINE

CROSS REFERENCE TO RELATED APPLICATIONS

This application is based on and claims priority under 35 U.S.C. § 119 to Japanese Patent Application 2023-212882, filed on Dec. 18, 2023, Japanese Patent Application 2024-077212, filed on May 10, 2024, Japanese Patent Application 2024-118566, filed on Jul. 24, 2024, and Japanese Patent Application 2024-206540, filed on Nov. 27, 2024, the entire content of which is incorporated herein by reference.

TECHNICAL FIELD

This disclosure relates to a reciprocating internal combustion engine.

BACKGROUND DISCUSSION

JP 9-119301A (Reference 1) discloses, as a power conversion device that can also be applied to a reciprocating internal combustion engine, a crank device (1) that converts a reciprocating motion of a piston (15) into a rotational motion of an output member (10) by a planetary gear mechanism (4) (reference numerals in parentheses in Background Discussion are those of the reference document). The planetary gear mechanism (4) includes a ring gear (20) that is a fixed internal gear, a planetary gear (21) that meshes with the ring gear (20), and a crank arm (11) that functions as a carrier that rotatably supports the planetary gear (21).

In the above-described crank device (1), as shown in FIG. 3 of the document, the planetary gear (21) is supported in a cantilever manner on the crank arm (11), and the crank arm (11) is also supported in a cantilever manner on a main shaft (10) of a crankshaft. Therefore, the structure makes it difficult to ensure an overall support strength and rigidity of the crank device (1) against a force transmitted from the piston (15).

A need thus exists for a reciprocating internal combustion engine which is not susceptible to the drawback mentioned above.

SUMMARY

According to an aspect of this disclosure, a reciprocating internal combustion engine includes: a planetary gear mechanism including a ring gear that is an internal gear, a carrier that is rotatably supported with respect to the ring gear, and a planetary gear that is rotatably supported with respect to the carrier and meshes with the ring gear; a crank member coupled to the planetary gear to rotate integrally with the planetary gear, with a direction along a carrier axis which is a rotation axis of the carrier being defined as an axial direction, a direction orthogonal to the carrier axis being defined as a radial direction, and a direction orthogonal to a planetary axis which is a rotation axis of the planetary gear being defined as a planetary radial direction; a piston member coupled to the crank member to be relatively rotatable about an input axis set at a position separately from the planetary axis in the planetary radial direction; and a transmission mechanism configured to transmit a rotation of the carrier to an output member. A radius of the ring gear is twice a radius of the planetary gear, a pair of planetary bearings are disposed separately on both sides of the planetary gear in the axial direction to rotatably support the planetary gear with respect to the carrier, a pair of carrier bearings are disposed separately on both sides of the ring gear in the axial direction to rotatably support the carrier with respect to the ring gear, the crank member includes a first crank portion and a second crank portion which are a pair of crank portions disposed separately on both sides of the carrier in the axial direction, the piston member includes a piston body and a pair of coupling portions including a first coupling portion and a second coupling portion that are coupled to the piston body and disposed separately on both sides of the carrier in the axial direction, the first crank portion and the second crank portion are disposed to extend in the planetary radial direction, the first coupling portion is coupled to the first crank portion to be relatively rotatable about the input axis, and the second coupling portion is coupled to the second crank portion to be relatively rotatable about the input axis.

BRIEF DESCRIPTION OF THE DRAWINGS

The foregoing and additional features and characteristics of this disclosure will become more apparent from the following detailed description considered with the reference to the accompanying drawings, wherein:

FIG. 15 is a schematic axial cross-sectional view of the reciprocating internal combustion engine in the eighth example (a cross-sectional view taken along line XV-XV of FIG. 14);

DETAILED DESCRIPTION

Figure 1:
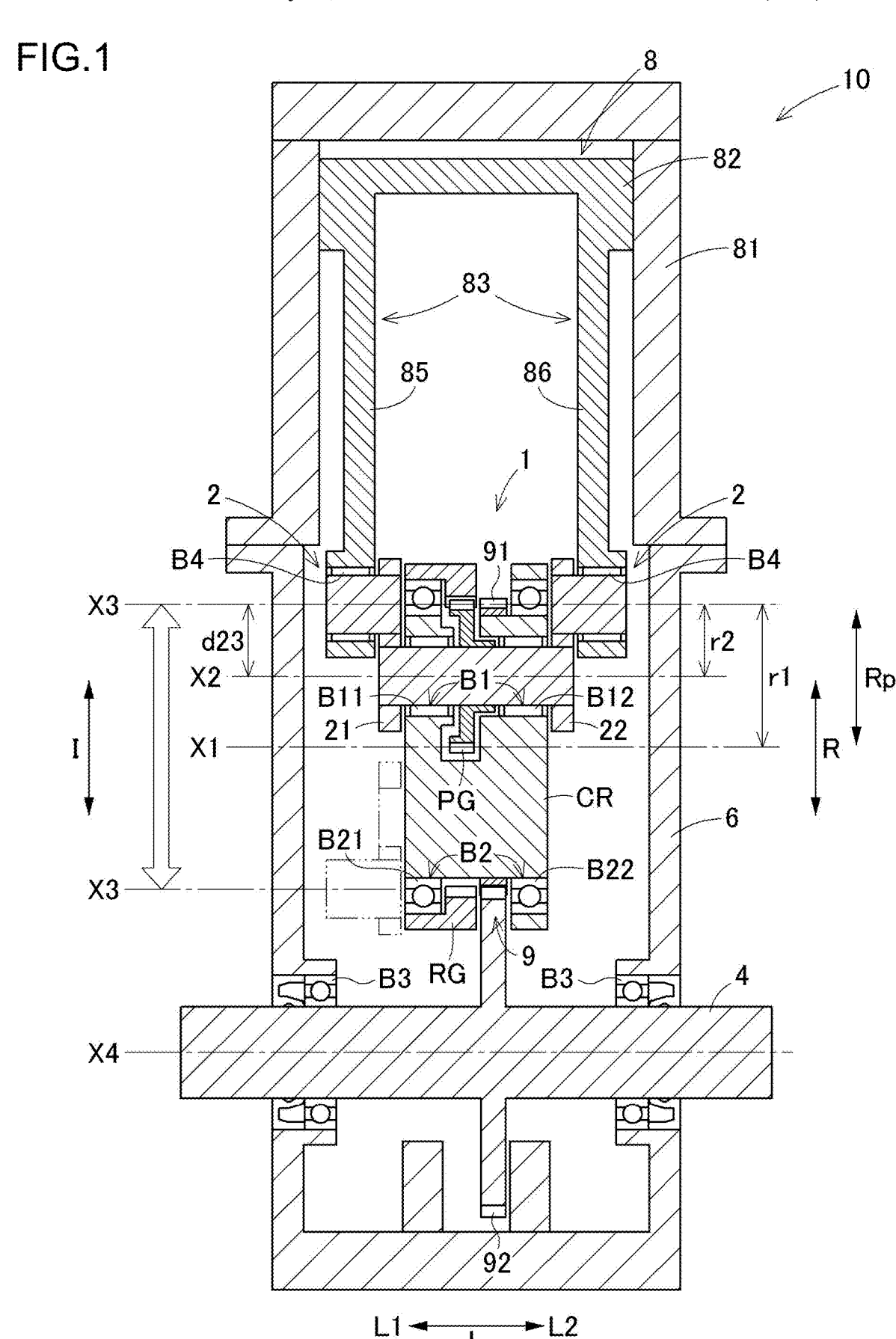
FIG. 1 is a schematic axial cross-sectional view of a reciprocating internal combustion engine in a first example.

Hereinafter, an embodiment of a reciprocating internal combustion engine will be described with reference to the drawings. FIG. 1 is an axial cross-sectional view schematically showing a reciprocating internal combustion engine 10 in a first example. The reciprocating internal combustion engine 10 includes a power conversion mechanism (corresponding to a "reciprocating unit 5" in second and third examples (see FIG. 2 to 5)) that includes a planetary gear mechanism 1, a crank member 2, and a piston member 8, and a transmission mechanism 9.

As will be described in detail later, the planetary gear mechanism 1 includes a ring gear RG that is an internal gear, a carrier CR that is rotatably supported with respect to the ring gear RG, and a planetary gear PG that is rotatably supported with respect to the carrier CR and meshes with the ring gear RG. The crank member 2 is coupled to the planetary gear PG to rotate integrally with the planetary gear PG. The piston member 8 is coupled to the crank member 2 to be rotatable with respect to the crank member 2 about an input axis X3 set at a position separated from a planetary axis X2, which is a rotation axis of the planetary gear PG, in a planetary radial direction Rp orthogonal to the planetary axis X2. The transmission mechanism 9 transmits the rotation of the carrier CR, which is an output rotation element of the planetary gear mechanism 1, to an output member 4. A rotation axis of the carrier CR is a carrier axis X1.

As described above, the planetary gear mechanism 1 includes the ring gear RG, the planetary gear PG, and the carrier CR. The ring gear RG is an internal gear and is, for example, fixed to a cylinder 81 to be non-rotatable. The ring gear RG may be fixed to another non-rotary member, such as a case in which the cylinder 81 is accommodated. The planetary gear PG is rotatably supported by the carrier CR and meshes with the ring gear RG. A radius of the ring gear RG (a ring radius r1) is twice a radius of the planetary gear PG (a planetary radius r2). The ring radius r1 and the planetary radius r2 are both the radii of gear pitch circles.

In the following description, a direction along the carrier axis X1 is referred to as an axial direction L, and a direction orthogonal to the carrier axis X1 is referred to as a radial direction R. As described above, the direction orthogonal to the planetary axis X2 is defined as the planetary radial direction Rp. The carrier axis X1 and the planetary axis X2 are parallel to each other. A plane along the radial direction R and a plane along the planetary radial direction Rp are also parallel to each other. One side of the axial direction L is referred to as an axial first side L1, and an opposite side thereof is referred to as an axial second side L2.

As shown in FIG. 1, the planetary gear mechanism 1 includes planetary bearings 1 and carrier bearings B2. The planetary bearings 1 are disposed in a pair on both sides in the axial direction L with respect to the planetary gear PG so as to rotatably support the planetary gear PG with respect to the carrier CR. When distinguishing the pair of planetary bearings 1, a bearing disposed on the axial first side L1 with respect to the planetary gear PG is referred to as a first planetary bearing B11, and a bearing disposed on the axial second side L2 is referred to as a second planetary bearing B12. The planetary bearing 1 is, for example, a needle bearing, a sliding bearing, or the like, which is relatively thin and has a small dimension in the planetary radial direction Rp. In the embodiment, the planetary gear PG and a rotation shaft of the planetary gear PG are integrally formed, and the rotation shaft is rotatably supported by the planetary bearing 1. Here, "integrally formed" may mean that components are formed from the same member, or that the components are integrally formed by fixing separate members.

The carrier bearings B2 are disposed in a pair on both sides in the axial direction L with respect to the ring gear RG so as to rotatably support the carrier CR with respect to the ring gear RG. When distinguishing the pair of carrier bearings B2, a bearing disposed on the axial first side L1 with respect to the ring gear RG is referred to as a first carrier bearing B21, and a bearing disposed on the axial second side L2 is referred to as a second carrier bearing B22. The carrier bearing B2 is, for example, a ball bearing.

The first carrier bearing B21 is disposed so as to overlap, as viewed in a radial direction along the radial direction R, a movement locus of the first planetary bearing B11 which accompanies a revolution of the planetary gear PG. Similarly, the second carrier bearing B22 is disposed so as to overlap, as viewed in the radial direction along the radial direction R, a movement locus of the second planetary bearing B12 which accompanies the revolution of the planetary gear PG. Further, "overlapping in a specific direction view" relating to an arrangement of two elements refers to that when a virtual straight line parallel to a visual line direction is moved in directions each orthogonal to the virtual straight line, a region in which the virtual straight line intersects with both of the two elements exists at least in part.

In other words, the first planetary bearing B11 and the first carrier bearing B21 overlap each other as viewed in the radial direction, and the second planetary bearing B12 and the second carrier bearing B22 overlap each other as viewed in the radial direction. Accordingly, it is easy to reduce a dimension of the reciprocating internal combustion engine 10 in the axial direction L. Also in this case, the configuration is not limited to one in which the entirety of one bearing overlaps with the other bearing, and the bearings may partially overlap each other.

The crank member 2 includes a pair of crank portions disposed separately on both sides in the axial direction L with respect to the carrier CR. Specifically, the crank member 2 includes a pair of crank portions including a first crank portion 21 disposed on the axial first side L1 with respect to the carrier CR and a second crank portion 22 disposed on the axial second side L2. Further, the first crank portion 21 and the second crank portion 22 are disposed so as to extend in the planetary radial direction Rp. As shown in FIG. 1, the crank member 2 extends over the planetary axis X2 and the input axis X3 separated from the planetary axis X2 in the planetary radial direction Rp. The crank member 2 is coupled to the planetary gear PG to rotate integrally with the planetary gear PG.

The piston member 8 includes a piston body 82, and a pair of coupling portions (connecting rods 83) that are coupled to the piston body 82 and that are disposed separately on both sides in the axial direction L with respect to the carrier CR. Specifically, the pair of connecting rods 83 includes a first coupling portion 85 disposed on the axial first side L1 with respect to the carrier CR, and a second coupling portion 86 disposed on the axial second side L2.

The crank member 2 and the piston member 8 are coupled by coupling the first crank portion 21 and the first coupling portion 85 so as to be rotatable relative to each other about the input axis X3, and coupling the second crank portion 22 and the second coupling portion 86 so as to be rotatable relative to each other about the input axis X3. Crank bearings B4 are disposed between the first crank portion 21 and the first coupling portion 85, and between the second crank portion 22 and the second coupling portion 86, respectively, and the crank portions and the coupling portions are coupled via the crank bearings B4 so as to be rotatable relative to each other. The crank bearing B4 is a rotation support member, such as a needle bearing, a sliding bearing, or a metal bushing, that is relatively thin and has a small dimension in the radial direction R (planetary radial direction Rp).

As shown in FIG. 1, in the embodiment, an example is shown in which a shaft-shaped input member disposed on the input axis X3 is provided integrally with the crank member 2, and the input member and the connecting rod 83 are coupled to each other so as to be rotatable relative to each other. However, the embodiment is not limited to this configuration. For example, a shaft-shaped input member may be provided integrally with connecting rod 83 on the input axis X3, and the input member and crank member 2 may be coupled to each other so as to be rotatable relative to each other. In addition, the input member may be provided separately from the crank member 2 and the connecting rod 83. In addition, the input member may not be a shaft-shaped member, and the input axis X3 may be a virtual axis.

When a driving force from the piston member 8 is input to the input member on the input axis X3, the input member reciprocates with the carrier axis X1 as a reference. In accordance with the reciprocating motion, the carrier CR rotates about the carrier axis X1.

In the embodiment, the radius of the planetary gear PG (planetary radius r2) is equal to a distance between the planetary axis X2 and the input axis X3 in the planetary radial direction Rp (an inter-axial distance d23). Therefore, the movement locus in which the input member (input axis X3) reciprocates is a straight line passing through the carrier axis X1 as viewed in the axial direction L. In the following description, a direction along the linear movement locus in which the input axis X3 reciprocates is referred to as a "reciprocating direction I". The first coupling portion 85 and the second coupling portion 86 are integrally coupled to the piston body 82. In the embodiment, a configuration in which the piston body 82 and the coupling portion (connecting rods 83) are integrally formed from the same member is illustrated. However, the piston body 82 and the connecting rods 83 may be formed from separate members and integrated together by fastening with bolts or by welding.

The crank member 2 shown by the solid line in FIG. 1 shows a state in which the piston body 82 is positioned at a top dead center of the reciprocating motion, and the crank member 2 partially shown by the virtual line shows a state in which the piston body 82 is positioned at a bottom dead center of the reciprocating motion. In the embodiment, in a state in which the piston body 82 is positioned at the bottom dead center of the reciprocating motion, the ring gear RG and the carrier CR are interposed between the first coupling portion 85 and the second coupling portion 86 in the axial direction L, and are disposed so as to overlap the first coupling portion 85 and the second coupling portion 86 as viewed in the axial direction.

The inter-axial distance d23 between the planetary axis X2 and the input axis X3 in the planetary radial direction Rp may be different from the planetary radius r2. When the inter-axial distance d23 and the planetary radius r2 are different from each other, the movement locus of the input axis X3 is an elliptical trajectory. In this case, the first coupling portion 85 and the second coupling portion 86 are swingably coupled to the piston body 82.

The output member 4 is drivingly coupled to the carrier CR via the transmission mechanism 9. In the embodiment, as shown in FIG. 1, the transmission mechanism 9 includes a transmission gear 91 that rotates integrally with the carrier CR, and an output gear 92 that meshes with the transmission gear 91 and rotates integrally with the output member 4. The output gear 92 and the output member 4 are rotatably supported about an output axis X4 parallel to the carrier axis X1. In the embodiment, the output member 4 is rotatably supported on a case 6 coupled to the cylinder 81 via a pair of output bearings B3. The output bearing B3 is, for example, a ball bearing. The transmission gear 91 and the output gear 92 are disposed between the pair of carrier bearings B2 in the axial direction L.

Here, a configuration in which the output member 4 is a shaft-shaped member is illustrated, and is not limited thereto. The transmission mechanism 9 is not limited to the gear mechanism such as the transmission gear 91 and the output gear 92 as illustrated above. For example, when the carrier CR is coupled to a rotor of a rotary electrical machine that functions as a generator, the rotor of the rotary electrical machine may be the output member 4. In addition, the transmission gear 91 and the output gear 92 may serve as the output member 4.

In the embodiment, as shown in FIG. 1, rotary members in a power transmission path from the piston member 8 to the output member 4 are supported left-right symmetrically as viewed from a direction orthogonal to the axial direction L. Therefore, it is easy to extend a life of the planetary gear mechanism 1 and the transmission mechanism 9 compared to when the planetary gear PG and the like are supported in a cantilever manner. Further, in the embodiment, the pair of connecting rods 83 of the piston member 8 and the pair of crank portions (the first crank portion 21 and the second crank portion 22) are separately disposed on both sides in the axial direction L with respect to the carrier CR, and are coupled to each other so as to be rotatable relative to each other about the input axis X3, and therefore, rigidity of a support structure for the piston member 8 can be easily ensured, and operations of the piston member 8 and the crank member 2 can be easily stabilized.

Figure 2:
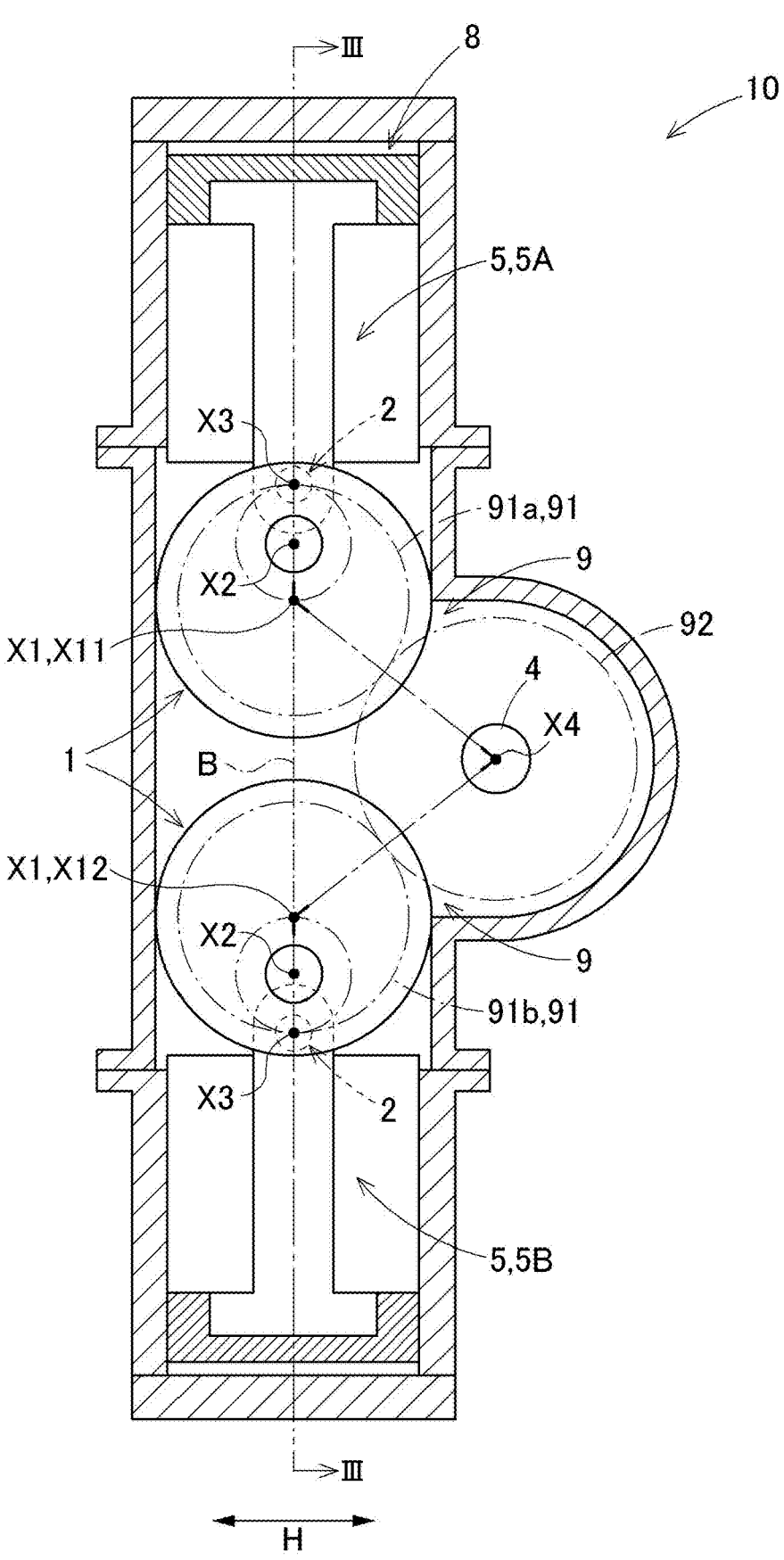
FIG. 2 is a schematic orthogonal axial cross-sectional view of the reciprocating internal combustion engine in a second example.
Figure 3:
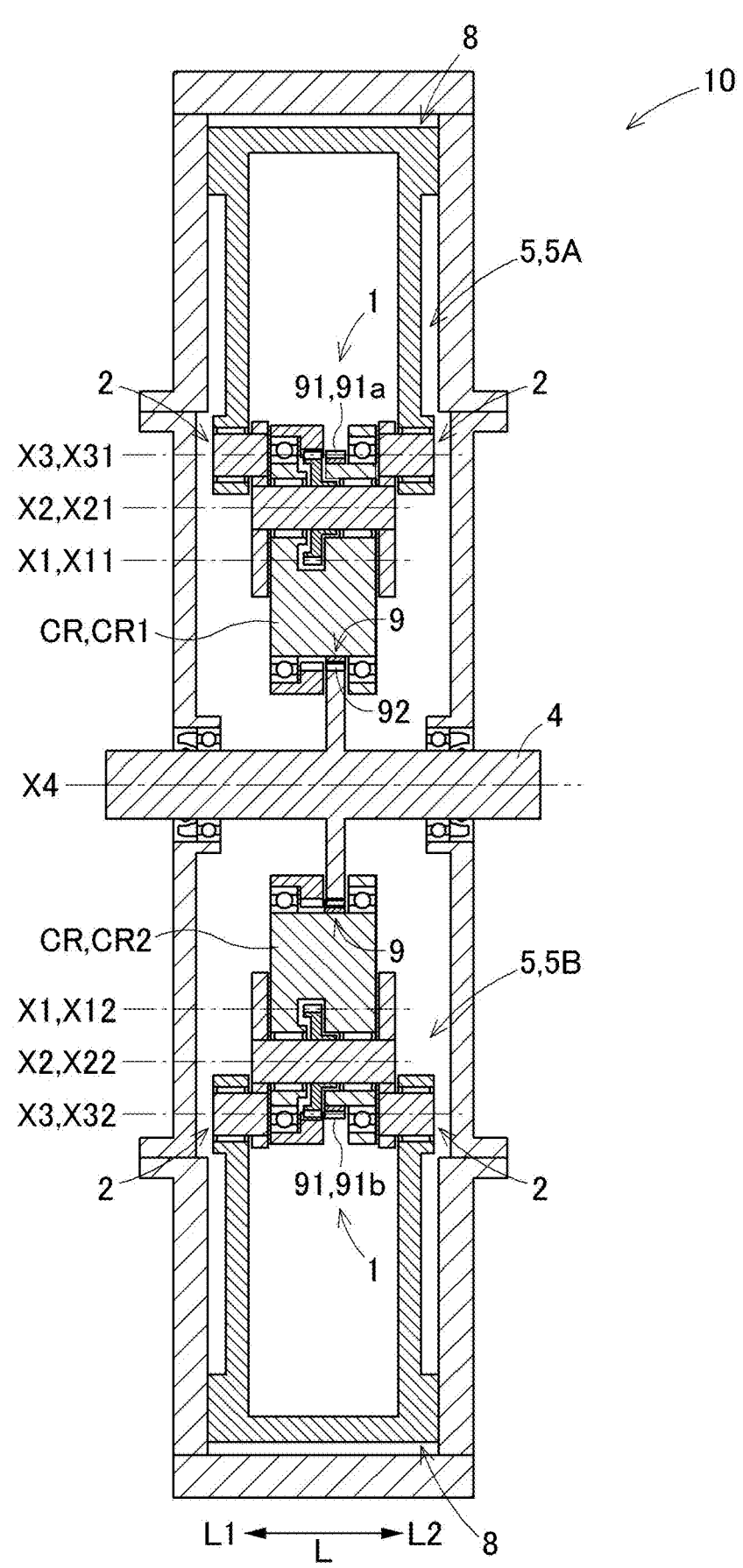
FIG. 3 is a schematic axial cross-sectional view taken along an III-III cross section in FIG. 2.

FIGS. 2 and 3 show the reciprocating internal combustion engine 10 in a second example. The reciprocating internal combustion engine 10 in the second example is a so-called two-cylinder internal combustion engine, and includes two sets of power conversion mechanisms each including the planetary gear mechanism 1, the crank member 2, and the piston member 8, and the transmission mechanism 9. Here, the set of the planetary gear mechanism 1, the crank member 2, and the piston member 8 is referred to as the reciprocating unit 5. The reciprocating internal combustion engine 10 in the second example includes a pair of reciprocating units 5. Further, each of the reciprocating units 5 is drivingly coupled to the common output member 4 via the transmission mechanism 9. The configuration of the reciprocating unit 5 is the same as that of the first example, and a detailed description thereof is omitted.

When the two reciprocating units 5 are distinguished, the reciprocating units are referred to as a first reciprocating unit 5A and a second reciprocating unit 5B, respectively, as shown in FIGS. 2 and 3. As shown in FIG. 3, the carrier axis X1 of the first reciprocating unit 5A is referred to as a first carrier axis X11, the carrier axis X1 of the second reciprocating unit 5B is referred to as a second carrier axis X12, the planetary axis X2 of the first reciprocating unit 5A is referred to as a first planetary axis X21, the planetary axis X2 of the second reciprocating unit 5B is referred to as a second planetary axis X22, the input axis X3 of the first reciprocating unit 5A is referred to as a first input axis X31, and the input axis X3 of the second reciprocating unit 5B is referred to as a second input axis X32. The carrier CR of the first reciprocating unit 5A is referred to as a first carrier CR1, and the carrier CR of the second reciprocating unit 5B is referred to as a second carrier CR2. As shown in FIGS. 2 and 3, in the second example, the transmission mechanism 9 includes a pair of transmission gears (a first transmission gear 91a and a second transmission gear 91b) and one output gear 92.

The first transmission gear 91a, which is one of the pair of transmission gears 91, rotates integrally with the carrier CR (first carrier CR1) of the first reciprocating unit 5A, which is one of the pair of reciprocating units 5. The second transmission gear 91b, which is the other of the pair of transmission gears 91, rotates integrally with the carrier CR (second carrier CR2) of the second reciprocating unit 5B, which is the other of the pair of reciprocating units 5. The output gear 92 meshes with both the first transmission gear 91a and the second transmission gear 91b.

In the embodiment, as shown in FIG. 2, when viewed in the axial direction, the output axis X4 is disposed at a position different from a line connecting the carrier axes X1 of a pair of reciprocating units 5 (virtual line "B"). That is, the output axis X4 is disposed at a position shifted from the virtual line "B" connecting the first carrier axis X11 and the second carrier axis X12.

As shown in FIGS. 2 and 3, in the embodiment, a configuration in which the piston member 8 of the first reciprocating unit 5A and the piston member 8 of the second reciprocating unit 5B are disposed opposite each other, that is, the reciprocating direction I of the piston member 8 of the first reciprocating unit 5A and the reciprocating direction I of the piston member 8 of the second reciprocating unit 5B are in a straight line is illustrated. However, a position relationship between the first reciprocating unit 5A and the second reciprocating unit 5B is not limited to the above configuration. For example, the reciprocating direction I of the piston member 8 of the first reciprocating unit 5A and the reciprocating direction I of the piston member 8 of the second reciprocating unit 5B may be parallel to each other, and the first reciprocating unit 5A and the second reciprocating unit 5B may be disposed in parallel. In addition, for example, the reciprocating direction I of the piston member 8 of the first reciprocating unit 5A and the reciprocating direction I of the piston member 8 of the second reciprocating unit 5B may intersect with each other, and the first reciprocating unit 5A and the second reciprocating unit 5B may be disposed in a so-called V shape.

The transmission mechanism 9 is not limited to a configuration in which both the first transmission gear 91a rotating integrally with the first carrier CR1 and the second transmission gear 91b rotating integrally with the second carrier CR2 mesh with the output gear 92. The transmission mechanism 9 may be implemented such that the first transmission gear 91a and the second transmission gear 91b mesh with each other, and the output gear 92 meshes with either the first transmission gear 91a or the second transmission gear 91b.

Although a configuration in which two reciprocating units 5 are provided is illustrated here, three or more reciprocating units 5 may be provided.

Figure 4:
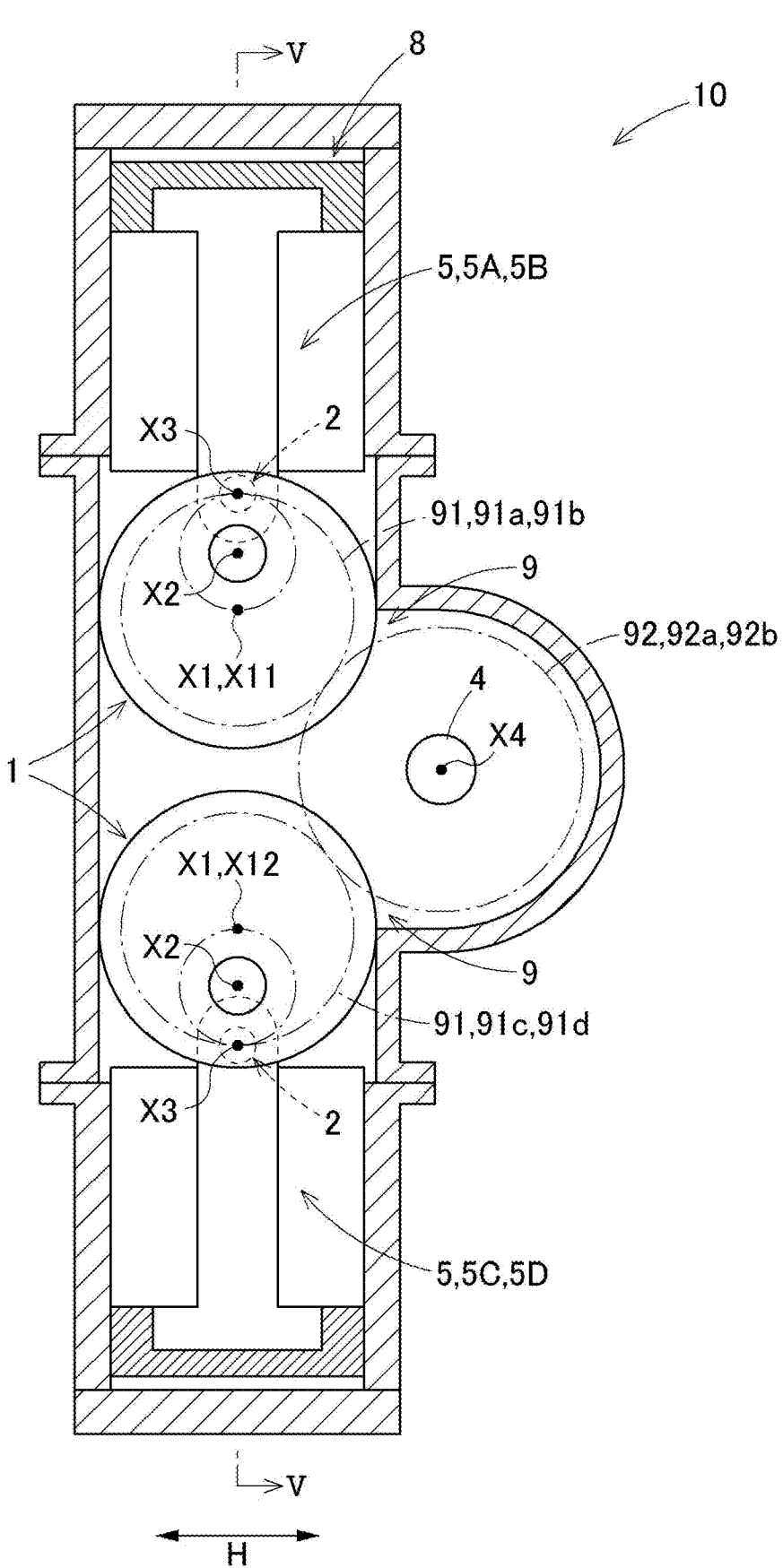
FIG. 4 is a schematic orthogonal axial cross-sectional view of the reciprocating internal combustion engine in a third example.
Figure 5:
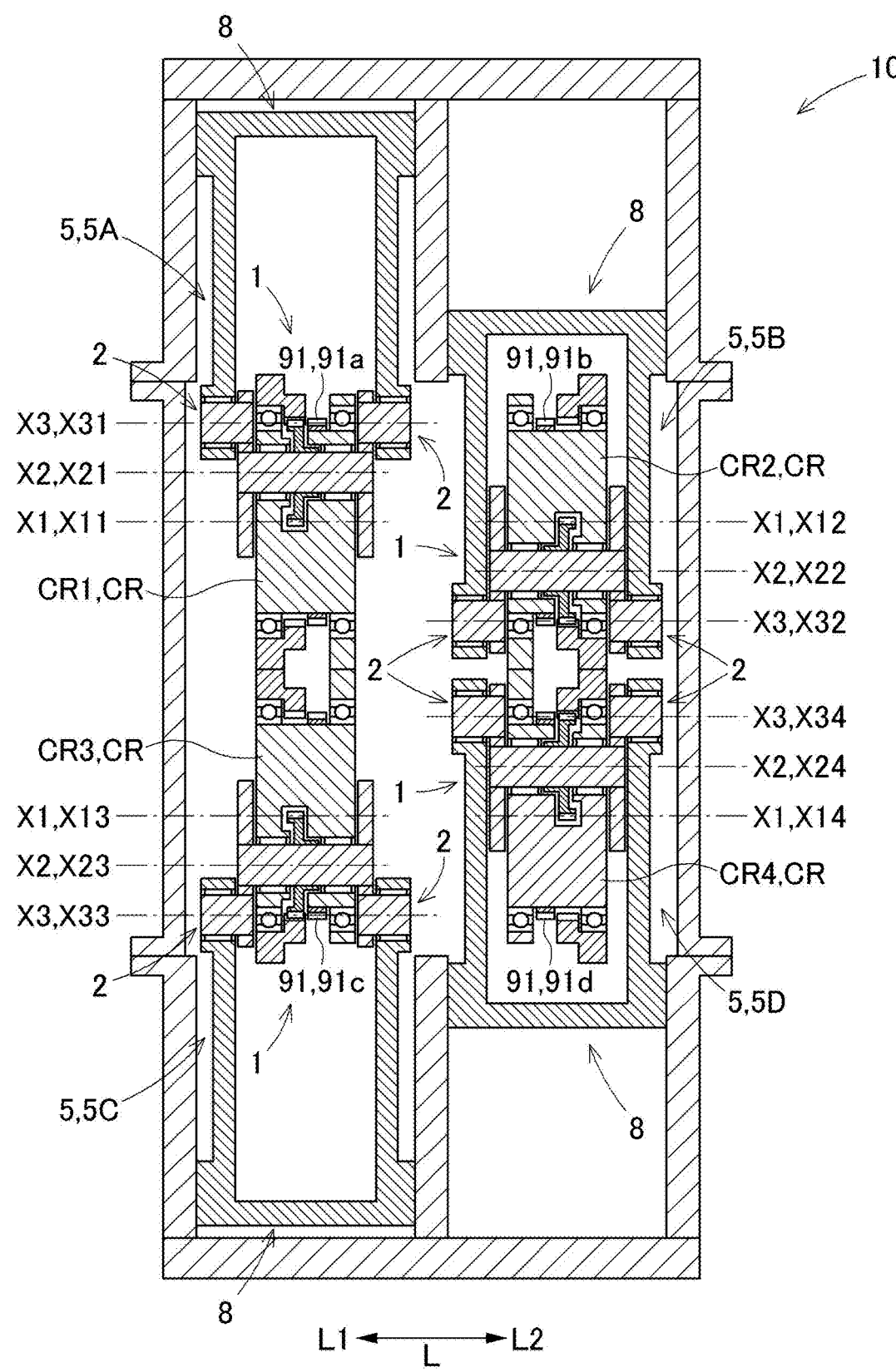
FIG. 5 is a schematic axial cross-sectional view taken along a V-V cross section in FIG. 4.

FIGS. 4 and 5 show the reciprocating internal combustion engine 10 in a third example. The reciprocating internal combustion engine 10 in the third example is a so-called four-cylinder internal combustion engine, and includes four sets of power conversion mechanisms (the reciprocating unit 5) including the planetary gear mechanism 1, the crank member 2, and the piston member 8, and the transmission mechanism 9. Also in the third example, the set of the planetary gear mechanism 1, the crank member 2, and the piston member 8 is referred to as the reciprocating unit 5. The configuration of the reciprocating unit 5 is the same as that of the first example, and a detailed description thereof is omitted.

When the four reciprocating units 5 are distinguished, as shown in FIG. 5, the reciprocating units are referred to as the first reciprocating unit 5A, the second reciprocating unit 5B, a third reciprocating unit 5C, and a fourth reciprocating unit 5D, respectively. The carrier axes X1 of the first reciprocating unit 5A to the fourth reciprocating unit 5D are referred to as the first carrier axis X11, the second carrier axis X12, a third carrier axis X13, and a fourth carrier axis X14, respectively, the planetary axes X2 of the first reciprocating unit 5A to the fourth reciprocating unit 5D are referred to as the first planetary axis X21, the second planetary axis X22, a third planetary axis X23, and a fourth planetary axis X24, respectively, and the input axes X3 of the first reciprocating unit 5A to the fourth reciprocating unit 5D are referred to as the first input axis X31, the second input axis X32, a third input axis X33, and a fourth input axis X34, respectively. The carriers CR of the first reciprocating unit 5A to the fourth reciprocating unit 5D are referred to as the first carrier CR1, the second carrier CR2, a third carrier CR3, and a fourth carrier CR4, respectively. In the third example, the transmission mechanism 9 includes four transmission gears (the first transmission gear 91a, the second transmission gear 91b, a third transmission gear 91c, and a fourth transmission gear 91d) and two output gears 92 (a first output gear 92a and a second output gear 92b).

As shown in FIG. 5, the first reciprocating unit 5A and the second reciprocating unit 5B are disposed side by side in the axial direction L. The third reciprocating unit 5C and the fourth reciprocating unit 5D are disposed side by side in the axial direction L. That is, the first reciprocating unit 5A and the second reciprocating unit 5B are a pair of the reciprocating units 5 disposed side by side in the axial direction L, and the third reciprocating unit 5C and the fourth reciprocating unit 5D are also a pair of the reciprocating units 5 disposed side by side in the axial direction L. The reciprocating internal combustion engine 10 in the third example can be said to include two pairs of the reciprocating units 5 disposed side by side in the axial direction L.

When focusing on each pair of the reciprocating units 5 disposed side by side in the axial direction L, the transmission mechanism 9 is implemented to include a pair of the transmission gears 91 and a pair of the output gears 92. In the pair of the first reciprocating unit 5A and the second reciprocating unit 5B, one of the pair of the transmission gears 91 is the first transmission gear 91a that rotates integrally with the carrier CR (the first carrier CR1) of the first reciprocating unit 5A that is one of the pair of reciprocating units 5, and the other of the pair of the transmission gears 91 is the second transmission gear 91*b* that rotates integrally with the carrier CR (the second carrier CR2) of the second reciprocating unit 5B that is the other of the pair of reciprocating units 5. Further, one of the pair of the output gears 92 is the first output gear 92*a* that meshes with the first transmission gear 91*a*, and the other of the pair of output gears 92 is the second output gear 92*b* that meshes with the second transmission gear 91*b*. Although both gears are not visible in FIG. 4 due to overlapping, the first output gear 92*a* and the second output gear 92*b* are disposed side by side in the axial direction L on the output axis X4. The first output gear 92*a* and the second output gear 92*b* are coupled to the output member 4 so as to rotate integrally with the output member 4.

Similarly, in the pair of the third reciprocating unit 5C and the fourth reciprocating unit 5D, one of the pair of transmission gears 91 is the third transmission gear 91*c* that rotates integrally with the carrier CR (the third carrier CR3) of the third reciprocating unit 5C that is one of the pair of reciprocating units 5, and the other of the pair of transmission gears 91 is the fourth transmission gear 91*d* that rotates integrally with the carrier CR (the fourth carrier CR4) of the fourth reciprocating unit 5D that is the other of the pair of reciprocating units 5. One of the pair of the output gears 92 is the first output gear 92*a* that meshes with the third transmission gear 91*c*, and the other of the pair of the output gears 92 is the second output gear 92*b* that meshes with the fourth transmission gear 91*d*.

In the case of a four-cylinder internal combustion engine, the first output gear 92*a* meshes with the first transmission gear 91*a* and the third transmission gear 91*c*. The second output gear 92*b* meshes with the second transmission gear 91*b* and the fourth transmission gear 91*d*.

In the third example, the configuration in which two pairs of the reciprocating units 5 disposed side by side in the axial direction L are provided is illustrated. Of course, the reciprocating internal combustion engine 10 may have a two-cylinder configuration including a pair of the reciprocating units 5 disposed side by side in the axial direction L. The number of the reciprocating units 5 disposed side by side in the axial direction L is not limited to two, and may be three or more.

Figure 6:
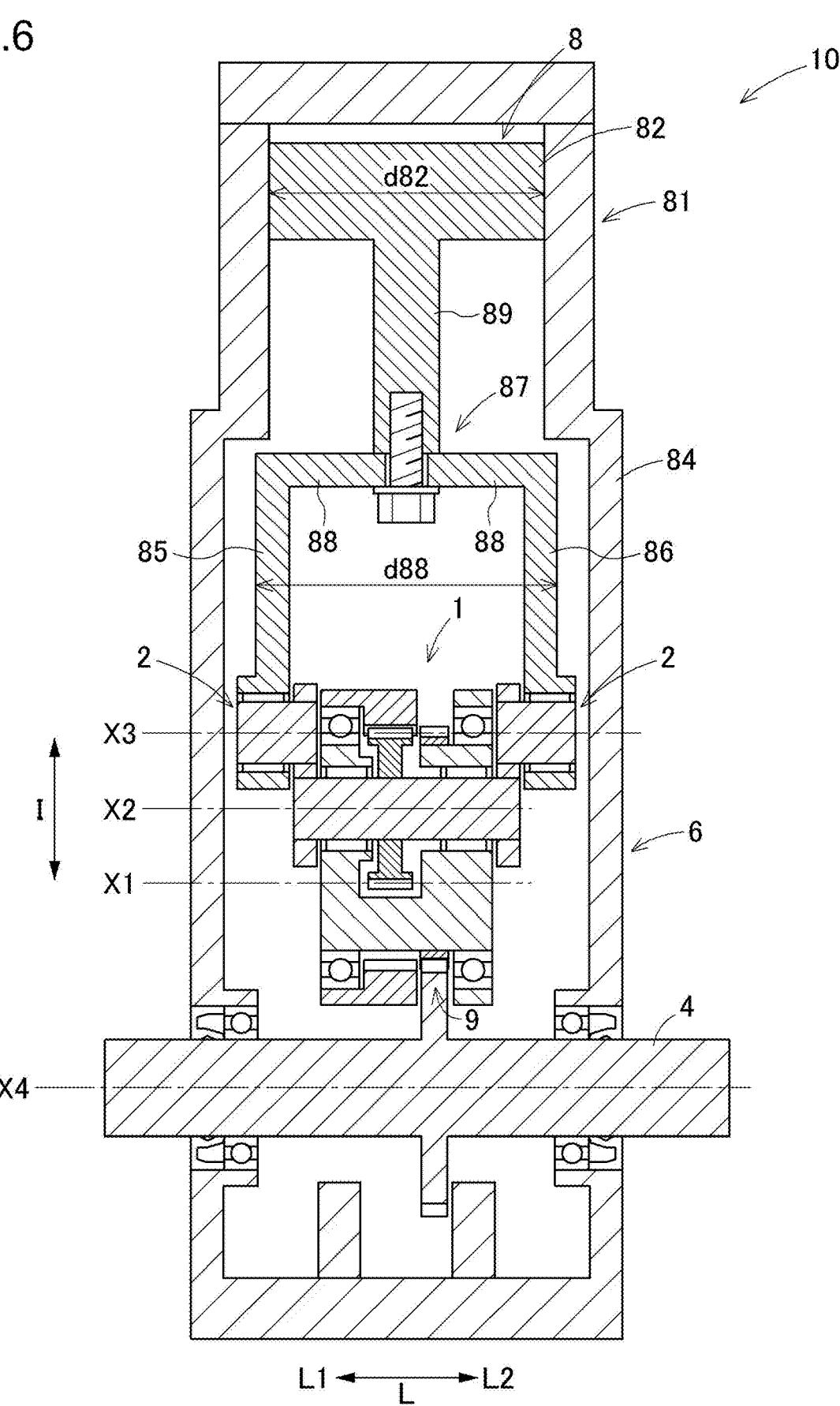
FIG. 6 is a schematic axial cross-sectional view of the reciprocating internal combustion engine in a fourth example.

FIG. 6 shows the reciprocating internal combustion engine 10 in a fourth example. The reciprocating internal combustion engine 10 in the fourth example has a power conversion mechanism having a structure similar to the reciprocating internal combustion engine 10 in the first example, but has a different configuration in the piston member 8. The configuration of the power conversion mechanism is the same as that of the first example, and a detailed description thereof is omitted.

In the reciprocating internal combustion engine 10 in the first example, the first coupling portion 85 and the second coupling portion 86 are integrally coupled to the piston body 82. However, in the reciprocating internal combustion engine 10 in the fourth example, the first coupling portion 85 and the second coupling portion 86 are integrally coupled to the piston body 82 via an intermediate coupling portion 87. The intermediate coupling portion 87 includes an axial coupling portion 88 and a reciprocating direction coupling portion 89. The axial coupling portion 88 couples the first coupling portion 85 and the second coupling portion 86 in the axial direction L. The reciprocating direction coupling portion 89 couples the axial coupling portion 88 and the piston body 82 in the reciprocating direction I. The axial coupling portion 88 and the reciprocating direction coupling portion 89 are fastened and fixed by a fastening member such as a bolt.

As shown in FIG. 6, a dimension of the axial coupling portion 88 in the axial direction L (a rod width d88) is larger than a dimension of the piston body 82 in the axial direction L (a piston ring diameter d82). A cross section orthogonal to the reciprocating direction I of the reciprocating direction coupling portion 89 is formed smaller than the piston body 82. Accordingly, a space is formed between the piston body 82 and the axial coupling portion 88. According to such a configuration, it is easy to ensure a large dimension in the axial direction L of the crank member 2 and the planetary gear mechanism 1 that support the piston body 82, and restrictions on the arrangement of the bearings can be reduced. Therefore, even when a load from the piston member 8 is large, the piston member 8 can be appropriately supported.

As described above with reference to the first to fourth examples, the reciprocating internal combustion engine 10 according to the embodiment can ensure a support strength and rigidity of a linear motion conversion mechanism that converts a linear motion of a piston into a rotational motion, and can achieve a stable operation.

Figure 7:
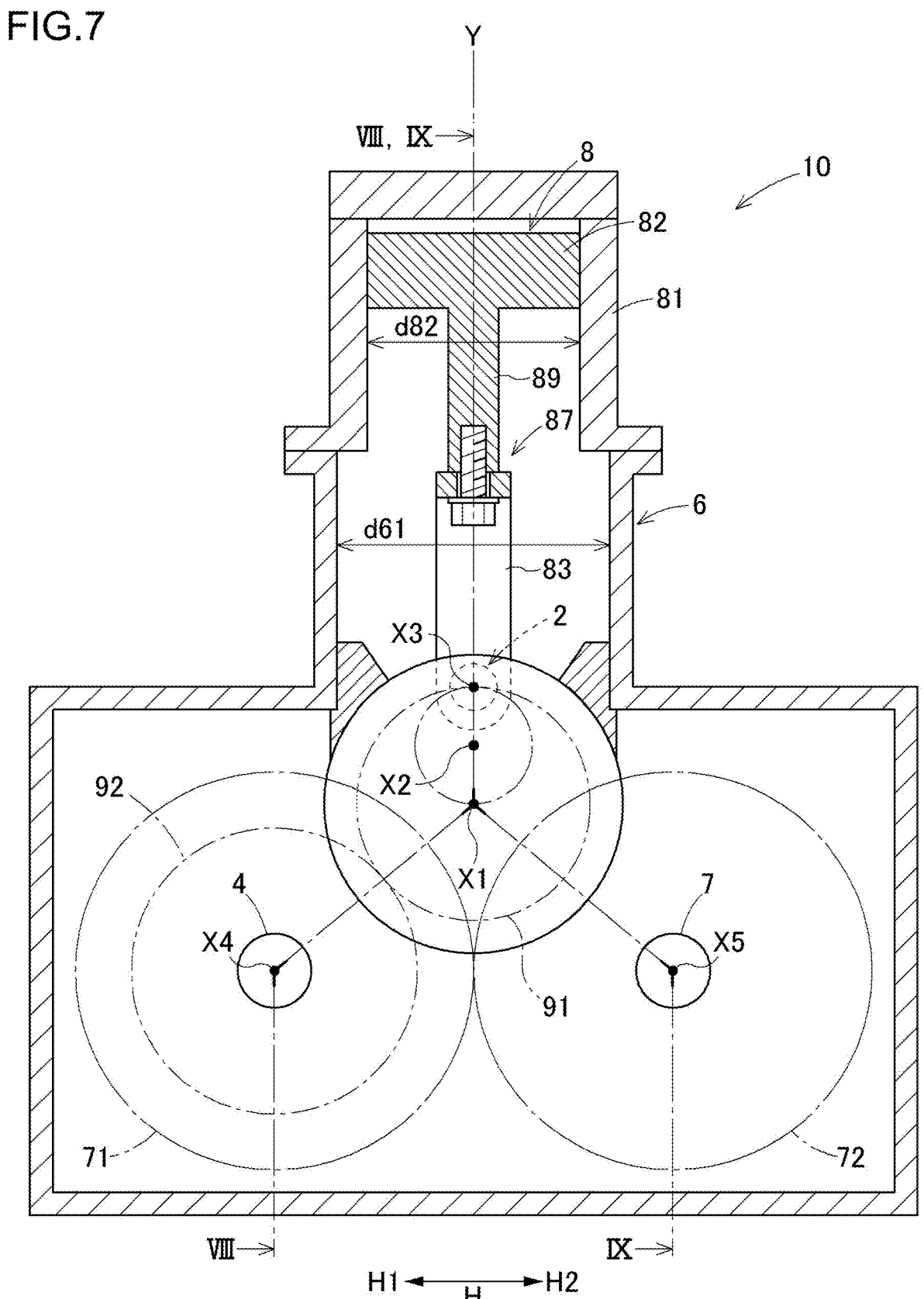
FIG. 7 is a schematic orthogonal axial cross-sectional view of the reciprocating internal combustion engine in a fifth example.
Figure 8:
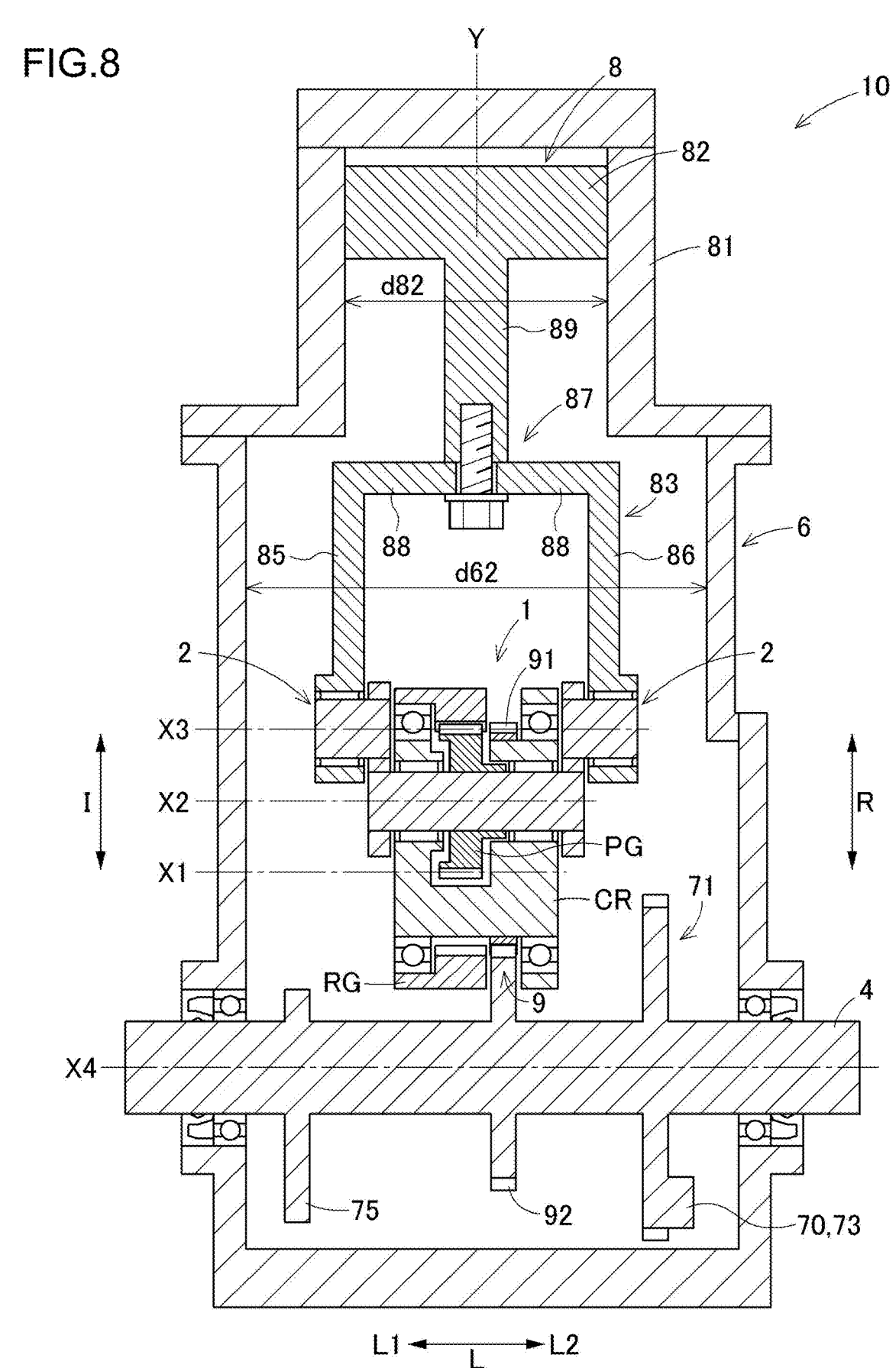
FIG. 8 is a schematic axial cross-sectional view of the reciprocating internal combustion engine in the fifth example (a cross-sectional view taken along line VIII-VIII in FIG. 7)
Figure 9:
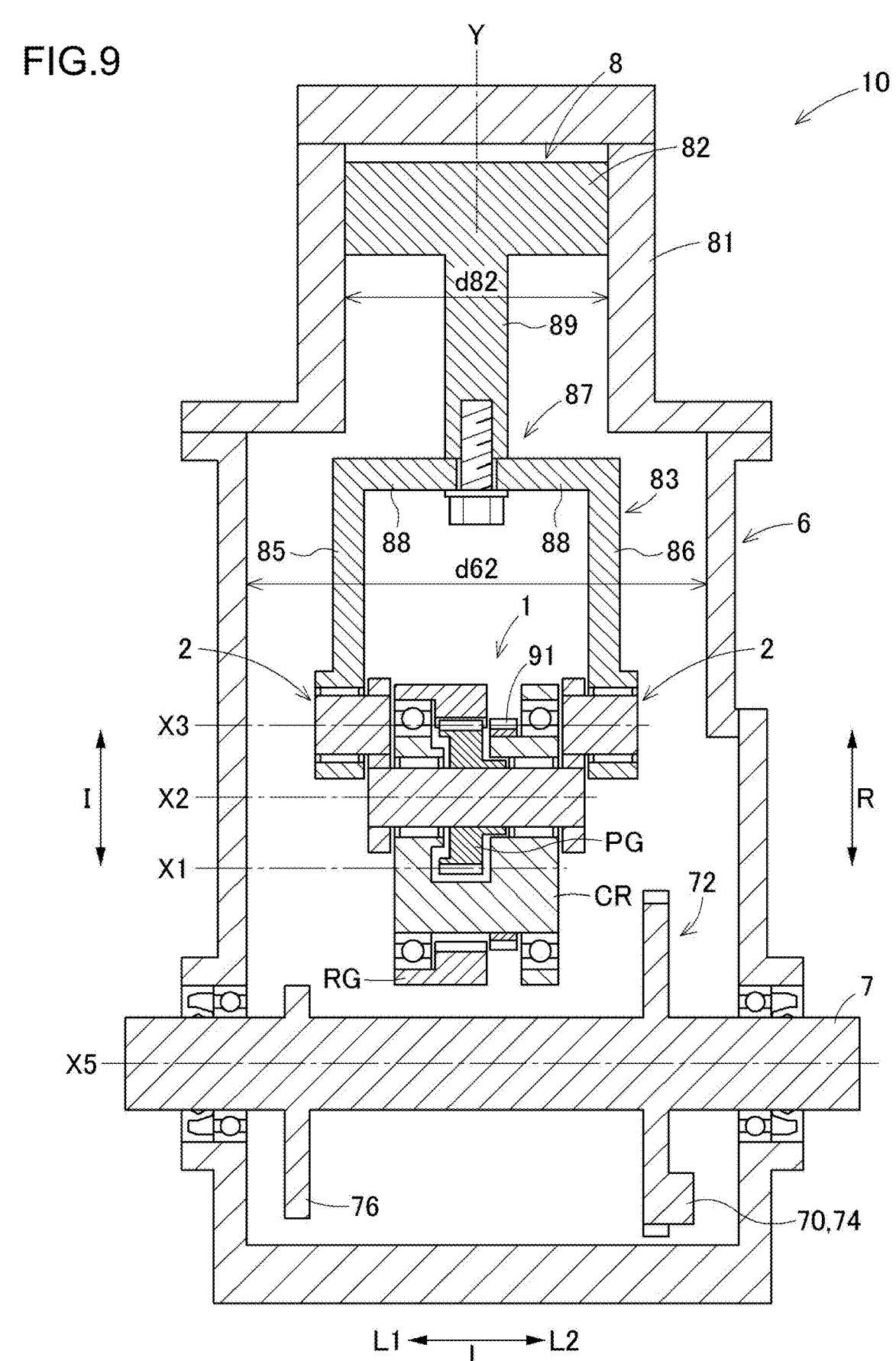
FIG. 9 is a schematic axial cross-sectional view of the reciprocating internal combustion engine in the fifth example (a cross-sectional view taken along line IX-IX in FIG. 7)
Figure 10:
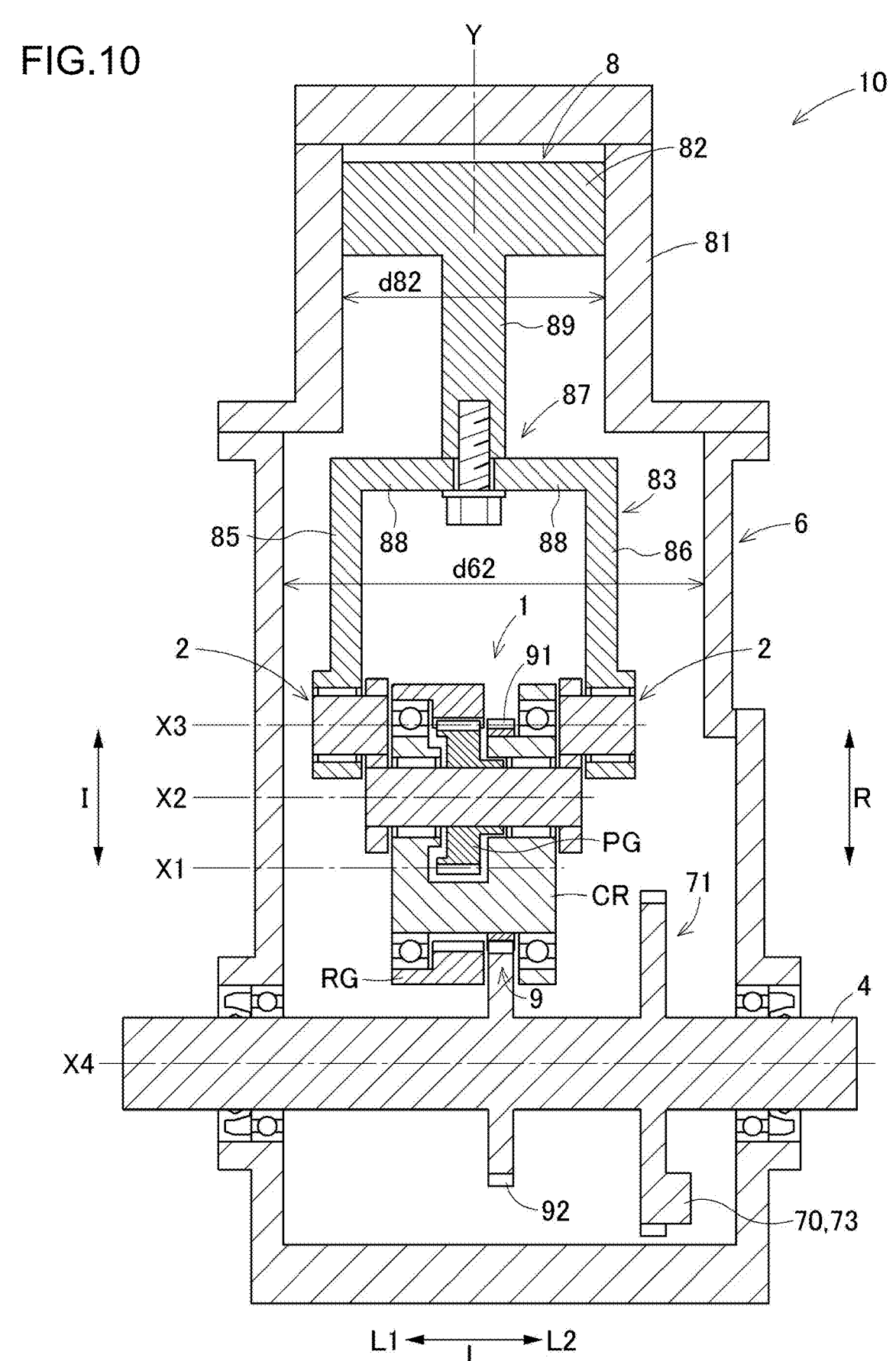
FIG. 10 is a schematic axial cross-sectional view of the reciprocating internal combustion engine in a sixth example (another form of FIG. 8)

Incidentally, in the reciprocating internal combustion engine 10, it is preferable to reduce a vibration that occurs due to the reciprocating motion. Hereinafter, with reference to FIGS. 7 to 10, the reciprocating internal combustion engine 10 having a function of reducing the vibration that occurs due to the reciprocating motion will be described. FIGS. 7 to 9 show the reciprocating internal combustion engine 10 in a fifth example, and FIG. 10 shows the reciprocating internal combustion engine 10 in a sixth example. FIG. 7 is a schematic orthogonal axial cross-sectional view of the reciprocating internal combustion engine 10 in the fifth example, and FIGS. 8 and 9 are schematic axial cross-sectional views of the reciprocating internal combustion engine 10 in the fifth example. FIG. 8 is a cross-sectional view taken along line VIII-VIII of FIG. 7, and FIG. 9 is a cross-sectional view taken along line IX-IX of FIG. 7. In addition, the orthogonal axial cross-sectional view of the reciprocating internal combustion engine 10 in the sixth example is similar to that of FIG. 7, and FIG. 10 can also be said to be a cross-sectional view taken along line VIII-VIII of FIG. 7, similar to FIG. 8 (when cross-sectional lines are shown in FIG. 7, a VIII-VIII cross-sectional line doubles as an X-X cross-sectional line).

As shown in FIGS. 7 and 8, also in the reciprocating internal combustion engine 10 in the fifth example, the transmission mechanism 9 includes the transmission gear 91 that rotates integrally with the carrier CR, and the output gear 92 that meshes with the transmission gear 91 and rotates integrally with the output member 4. The configuration of the power transmission mechanism from the piston body 82 to the output gear 92 is as described above with reference to FIGS. 1 to 6, particularly FIG. 6, and thus a detailed description thereof is omitted.

The output member 4 of the reciprocating internal combustion engine 10 in the fifth example is also rotatably supported about the output axis X4 parallel to the carrier axis X1, similarly to the reciprocating internal combustion engine 10 in the fourth example. However, the reciprocating internal combustion engine 10 in the fifth example further includes a first counter gear 71 that rotates integrally with the output member 4. Here, the first counter gear 71 is formed to have a larger diameter than that of the output gear 92. The reciprocating internal combustion engine 10 in the fifth example further includes, as a rotation shaft, a counter axis X5 parallel to the carrier axis X1. The reciprocating internal combustion engine 10 in the fifth example is provided with a counter mechanism including a counter shaft 7 supported rotatably about the counter axis X5, and a second counter gear 72. The second counter gear 72 meshes with the first counter gear 71 and rotates integrally with the counter shaft 7.

Here, a direction orthogonal to the reciprocating direction I (see FIG. 1) and the axial direction L is referred to as a width direction H, one side in the width direction H is referred to as a width direction first side H1, and the other side is referred to as a width direction second side H2. Further, an axis along the reciprocating direction I passing through the center of the piston body 82 in the reciprocating direction is referred to as a reciprocating drive axis Y. As shown in FIG. 7, the output axis X4 is disposed on the width direction first side H1 and the counter axis X5 is disposed on the width direction second side H with the reciprocating drive axis Y2 interposed therebetween. Therefore, the first counter gear 71 is disposed on the width direction first side H1, and the second counter gear 72 is disposed on the width direction second side H2. Here, when viewed in the axial direction, the output axis X4 and the counter axis X5 are in line symmetry with respect to the reciprocating drive axis Y which serves as the symmetry axis. Therefore, the first counter gear 71 and the second counter gear 72 are disposed at positions in line symmetry with respect to the reciprocating drive axis Y, which serves as the symmetry axis, when viewed in the axial direction.

It is preferable that the first counter gear 71 and the second counter gear 72 are gears of the same diameter and mass, except for manufacturing errors. As shown in FIGS. 8 and 9, each of the first counter gear 71 and the second counter gear 72 is a counter weight integrated gear in which a counter weight 70 is provided integrally with the gear. When the respective counter weights 70 are distinguished, the counter weight 70 of the first counter gear 71 is referred to as a first counter gear weight 73, and the counter weight 70 of the second counter gear 72 is referred to as a second counter gear weight 74.

For example, when the output axis X4, which is the rotation axis of the output member 4, is positioned on the reciprocating drive axis Y as viewed in the axial direction (although not shown in the drawings, the output axis X4 is positioned on the reciprocating drive axis Y in the first example, the second example, and the fourth example), it is easy to reduce the vibration in a direction along the reciprocating drive axis Y, whereas the vibration in the width direction H tends to remain. In the reciprocating internal combustion engine 10 in the fifth example, the output axis X4 and the counter axis X5 are disposed separately on both sides in the width direction H with the reciprocating drive axis Y interposed therebetween, the first counter gear 71 disposed on the output axis X4 and the second counter gear 72 disposed on the counter axis X5 mesh with each other, and the counter weights 70 are provided to both counter gears. The vibration in the direction along the reciprocating drive axis Y can be reduced by a movement of a center of gravity along the reciprocating drive axis Y between the first counter gear weight 73 that rotates integrally with the first counter gear 71 about the output axis X4 and the second counter gear weight 74 that rotates integrally with the second counter gear 72 about the counter axis X5. The first counter gear weight 73 and the second counter gear weight 74 are separately disposed in the width direction H. Here, the counter weights 70 having the same mass are disposed in line symmetry with respect to the reciprocating drive axis Y which serves as the symmetry axis. Therefore, the vibration in the width direction H is easily canceled out, and the vibration is easily reduced.

As shown in FIGS. 8 and 9, the reciprocating internal combustion engine 10 in the fifth example further includes a first counter weight 75 that rotates integrally with the output member 4, and a second counter weight 76 that rotates integrally with the counter shaft 7 independently of the first counter weight 75. It is preferable that the first counter weight 75 and the second counter weight 76 have the same shape and mass, except for manufacturing errors. The first counter weight 75 and the second counter weight 76 are disposed with the reciprocating drive axis Y interposed therebetween, similar to the position relationship between the first counter gear 71 and the second counter gear 72, with the first counter weight 75 being disposed on the width direction first side H1 and the second counterweight 76 being disposed on the width direction second side H2. Further, here, when viewed in the axial direction, the first counter weight 75 and the second counter weight 76 are disposed in a position relationship of line symmetry with respect to the reciprocating drive axis Y, which serves as the symmetry axis.

As shown in FIG. 8, the first counter gear 71 and the first counter weight 75 are separately disposed on both sides in the axial direction L with respect to the reciprocating drive axis Y and the output gear 92. It is preferable that the first counter gear 71 and the first counter weight 75 are separated from the reciprocating drive axis Y by the same distance in the axial direction L. Alternatively, the first counter gear 71 and the first counter weight 75 may be separated from the output gear 92 by the same distance in the axial direction L.

As shown in FIG. 9, the second counter gear 72 and the second counter weight 76 are also disposed on both sides in the axial direction L with respect to the reciprocating drive axis Y. It is preferable that the second counter gear 72 and the second counterweight 76 are separated from the reciprocating drive axis Y by the same distance in the axial direction L. When the first counter gear 71 and the first counter weight 75 are separated from the output gear 92 by the same distance in the axial direction L, it is preferable that the second counter weight 76 is disposed at a position corresponding to the first counter weight 75 in the axial direction L. Since the first counter gear 71 and the second counter gear 72 mesh with each other, the second counter gear 72 is disposed at a position corresponding to the first counter gear 71 in the axial direction L. Therefore, by matching the arrangement positions of the first counter weight 75 and the second counter weight 76 in the axial direction L, a weight balance between the first counter gear weight 73 and the first counter weight 75 on the output axis X4 and a weight balance between the second counter gear weight 74 and the second counter weight 76 on the counter axis X5 can be made equal.

By providing the first counterweight 75 and the second counterweight 76 in this way, it is possible to further appropriately reduce the vibration in the width direction H. In addition, the first counter gear 71 provided with the first counter gear weight 73 and the first counter weight 75 are disposed separately on both sides of the axial direction L with the reciprocating drive axis Y interposed therebetween, and the second counter gear 72 provided with the second counter gear weight 74 and the second counter weight 76 are disposed on both sides of the axial direction L with the reciprocating drive axis Y interposed therebetween, making it easy to achieve the weight balance in the axial direction L and to reduce the vibration in the axial direction L.

In addition to the above, the first counter gear weight 73 and the first counter weight 75 are implemented such that a moment about the output axis X4 of the first counter gear weight 73 and the first counter weight 75 is in an opposite direction to and of the same magnitude as the sum of moments about the counter axis X5 by the second counter gear weight 74 and the second counter weight 76. Therefore, the sum of the mass of the first counter gear weight 73 and the mass of the first counter weight 75 is the same as the sum of the mass of the second counter gear weight 74 and the mass of the second counter weight 76. According to the configuration, the vibration in the width direction H generated by rotating the output member 4 is appropriately reduced by the counter mechanism.

Further, in a state in which the piston body 82 is positioned at each of the top dead center and the bottom dead center, a resultant force of centrifugal forces acting on the first counter gear weight 73, the first counter weight 75, the second counter gear weight 74, and the second counterweight 76 are in the opposite direction to and of the same magnitude as a resultant force of an inertial force acting on the piston member 8 and a centrifugal force acting on the crank member 2. Therefore, gravity center positions and mass of the first counter gear weight 73, the first counter weight 75, the second counter gear weight 74, and the second counter weight 76 are determined in consideration of the inertial force acting on the piston body 82 in a state in which the piston body 82 is positioned at each of the top dead center and the bottom dead center, and the centrifugal force of the crank member 2. According to the configuration, it is possible to effectively reduce the vibration that occurs due to the reciprocating motion of the piston member 8 and the crank member 2.

As described above, with reference to FIGS. 7 to 9, the configuration of the reciprocating internal combustion engine 10 in the fifth example that includes not only the first counter gear weight 73 and the second counter gear weight 74 but also the first counter weight 75 and the second counter weight 76 in consideration of the balance between the weight balance in the axial direction L, the balance between the moment about the output axis X4 and the moment about the counter axis X5, and the balance of forces acting on the respective configurations of the reciprocating internal combustion engine 10. However, the configuration may be that the first counter weight 75 and the second counter weight 76 are not provided, such as the reciprocating internal combustion engine 10 in the sixth example illustrated in FIG. 10.

The cylinder 81 in which the piston body 82 reciprocates along the reciprocating direction I has a cylindrical shape with the piston ring diameter d82 as the inner diameter. Meanwhile, a portion in which the connecting rod 83 is accommodated in the case 6 is formed into a square tubular shape having a rectangular cross section, or a tubular shape having an elliptical or a track-shaped cross section. That is, an inner dimension in the width direction H (a width direction dimension d61 (see FIG. 7)) and an inner dimension in the axial direction L (an axial dimension d62 (see FIGS. 8 to 10)) are different, and here, the axial dimension d62 is longer than the width direction dimension d61. As is clear from comparison between FIG. 8 and FIG. 10, the axial dimension d62 of the reciprocating internal combustion engine 10 in the sixth example is shorter than the axial dimension d62 of the reciprocating internal combustion engine 10 in the fifth example. That is, as in the reciprocating internal combustion engine 10 in the sixth example, when the first counter weight 75 and the second counter weight 76 are not provided, the axial dimension d62 can be reduced as compared with the reciprocating internal combustion engine 10 in the fifth example including the first counterweight 75 and the second counterweight 76, and the size of the reciprocating internal combustion engine 10 can be easily reduced.

Further, in the reciprocating internal combustion engine 10, in addition to the reduction in the vibration that occurs due to the reciprocating motion, it is preferable that a degree of freedom in setting an overall shape is high. For example, in order to reduce the vibration in the width direction H, it is preferable that the shape of the width direction first side H1 and the shape of the width direction second side H2 of the reciprocating internal combustion engine 10 are in line symmetry with the reciprocating drive axis Y serving as the symmetry axis, as in the fifth and sixth examples. However, there is a case in which a position relationship among the connecting rod 83, the output gear 92, and a counter gear 93 is one of restrictions on setting the overall shape. Therefore, in a seventh example, the rotation of the transmission gear 91 is directly transmitted to both the output gear 92 and the counter gear 93, thereby reducing the vibration and increasing a degree of freedom in setting the overall shape.

Figure 11:
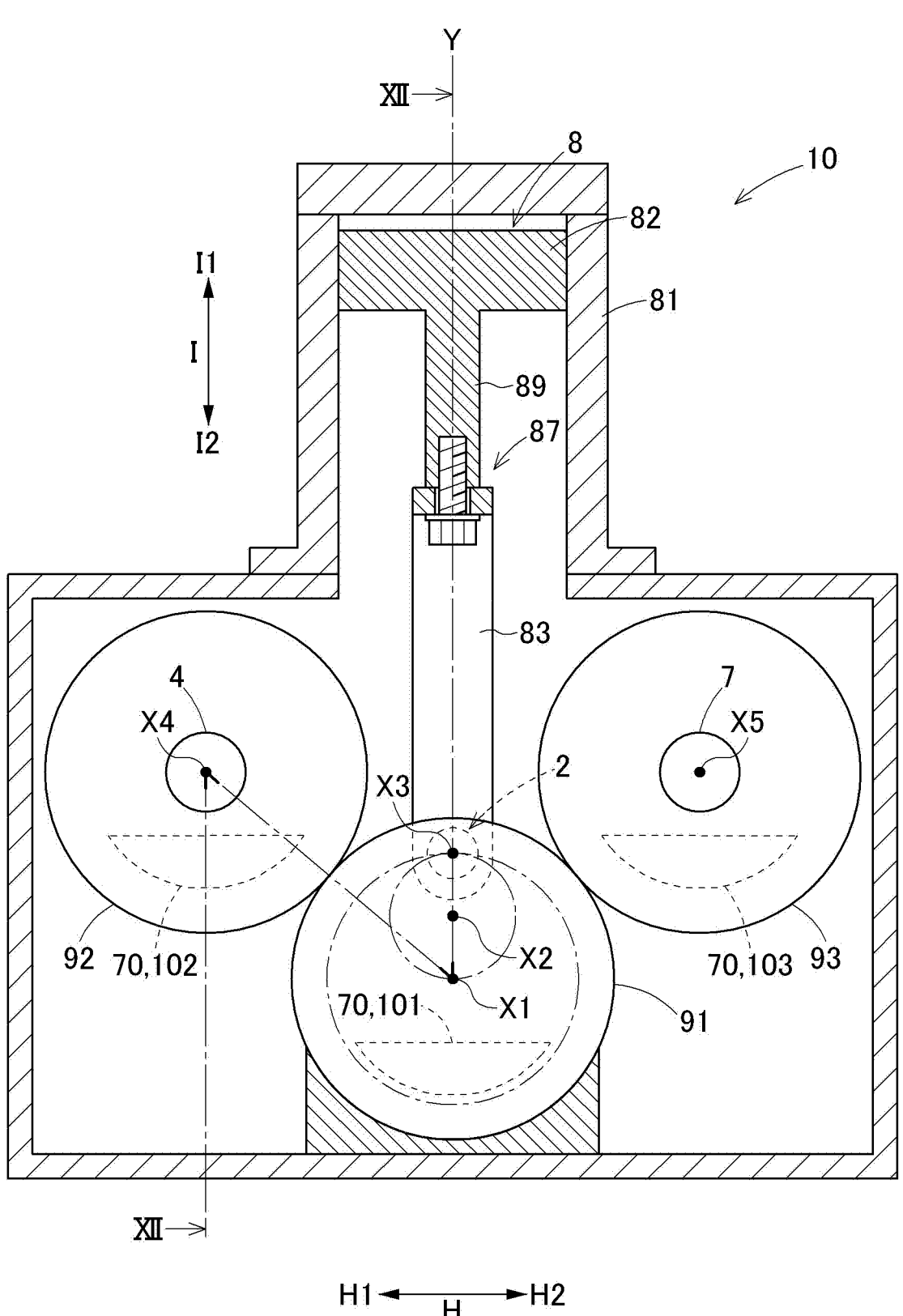
FIG. 11 is a schematic orthogonal axial cross-sectional view of the reciprocating internal combustion engine in a seventh example.
Figure 12:
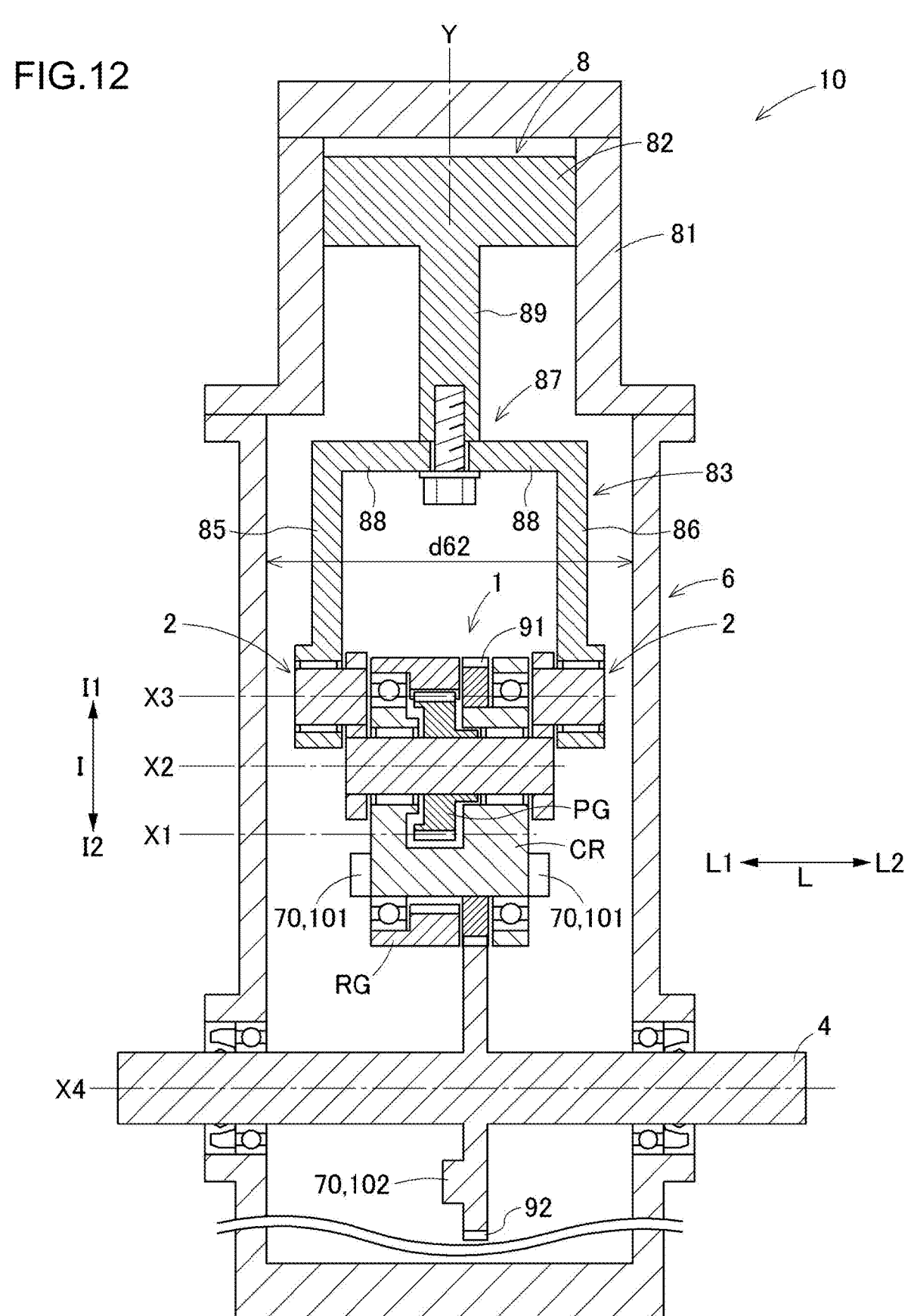
FIG. 12 is a schematic axial cross-sectional view of the reciprocating internal combustion engine in the seventh example (a cross-sectional view taken along line XII-XII of FIG. 11)
Figure 13:
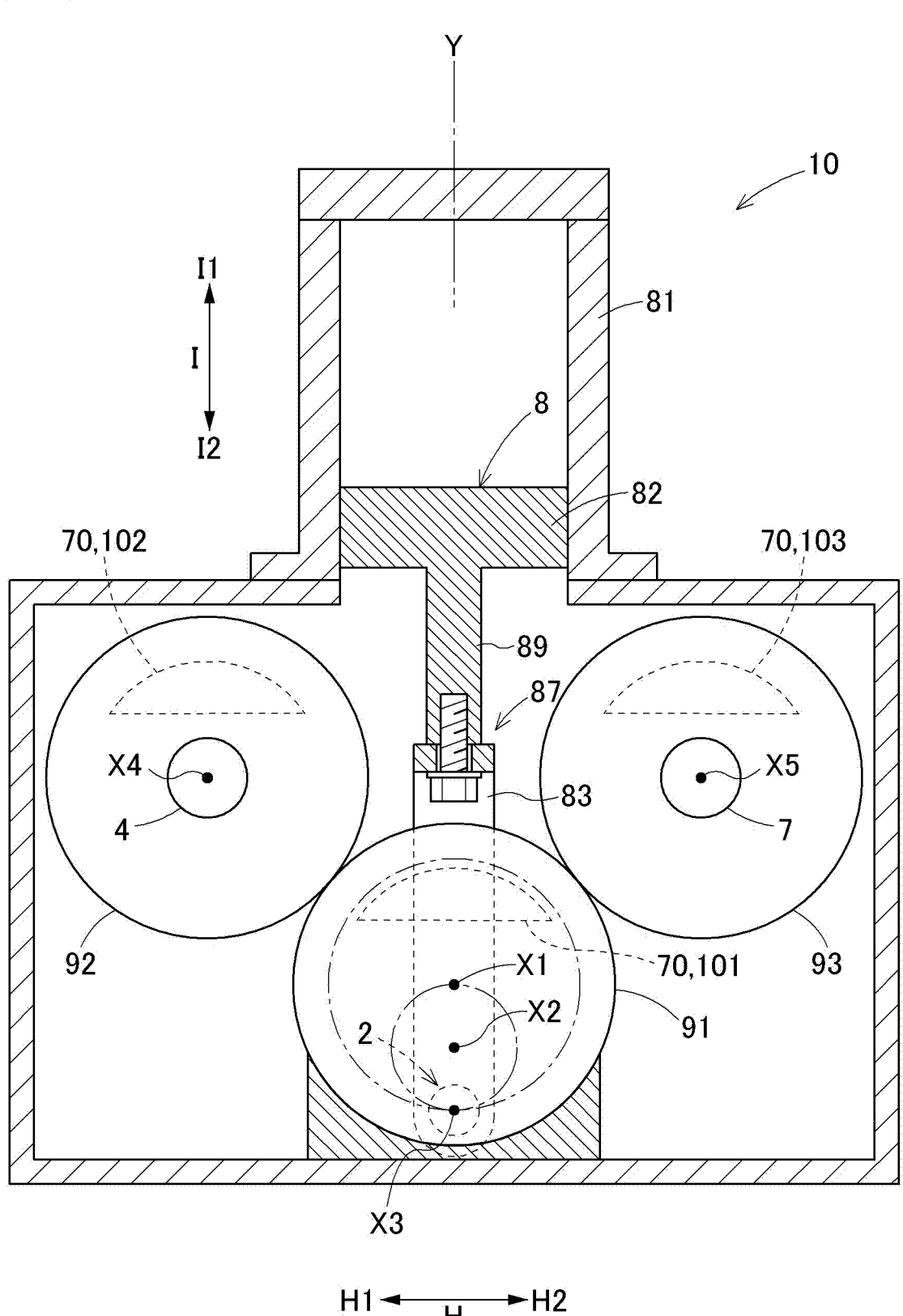
FIG. 13 is a diagram showing a state in which a piston body of FIG. 11 is positioned at a bottom dead center.

Hereinafter, with reference to FIGS. 11 to 13, in addition to the function of reducing the vibration that occurs due to the reciprocating motion, the reciprocating internal combustion engine 10 in which the degree of freedom in setting an overall shape is increased will be described. FIGS. 11 to 13 show the reciprocating internal combustion engine 10 in the seventh example. FIG. 11 is a schematic orthogonal axial cross-sectional view of the reciprocating internal combustion engine 10 in the seventh example, FIG. 12 is a cross-sectional view taken along line XII-XII in FIG. 11. FIG. 12 shows a state in which the piston body 82 of FIG. 11 is positioned at the bottom dead center.

As shown in FIGS. 11 and 12, also in the reciprocating internal combustion engine 10 in the seventh example, the transmission mechanism 9 includes the transmission gear 91 that rotates integrally with the carrier CR, and the output gear 92 that meshes with the transmission gear 91 and rotates integrally with the output member 4. The configuration of the power transmission mechanism from the piston body 82 to the transmission gear 91 is as described above with reference to FIGS. 1 to 6, particularly FIG. 6, and thus a detailed description thereof is omitted. In addition, the reciprocating direction I, the reciprocating drive axis Y, and the width direction H are also as described above with reference to FIGS. 1 to 10. Here, in the following description, a side close to the piston member 8 in the reciprocating direction I is referred to as a reciprocating direction first side I1, and a side opposite thereto is referred to as a reciprocating direction second side I2.

The output member 4 of the reciprocating internal combustion engine 10 in the seventh example is also rotatably supported about the output axis X4 parallel to the carrier axis X1, similarly to the reciprocating internal combustion engine 10 in the fourth or the fifth example, for example. However, the reciprocating internal combustion engine 10 in the seventh example further includes a counter mechanism including the counter shaft 7 rotatably supported about the counter axis X5 parallel to the carrier axis X1 and the counter gear 93. The counter gear 93 meshes with the transmission gear 91 and rotates integrally with the counter shaft 7. According to the configuration, since both the output gear 92 and the counter gear 93 mesh with the transmission gear 91, as compared with the axial dimension d62 of the case 6 in the fifth example (see FIG. 9) and the axial dimension d62 of the case 6 in the sixth example (see FIG. 10), the axial dimension d62 of the case 6 (see FIG. 12) is easily set to be short. In addition, in the example shown in FIG. 11, the transmission gear 91, the output gear 92, and the counter gear 93 are disposed to be positioned between the first coupling portion 85 and the second coupling portion 86 in the axial direction L. In addition, in the example shown in FIG. 11, the carrier axis X1 is disposed at a position intersecting the reciprocating drive axis Y According to the configuration, it is easy to set the overall shape of the reciprocating internal combustion engine 10 in line symmetry in the width direction H with the reciprocating drive axis Y serving as the symmetry axis. As a result, the vibration in the width direction H of the reciprocating internal combustion engine 10 are easily canceled out.

In the embodiment, the transmission gear 91, the output gear 92, and the counter gear 93 mesh with each other so as to rotate at the same speed. That is, the transmission gear 91, the output gear 92, and the counter gear 93 have the same number of teeth. In addition, in the embodiment, the transmission gear 91, the output gear 92, and the counter gear 93 have the same diameter except for manufacturing errors.

As shown in FIGS. 10 and 11, each of the transmission gear 91, the output gear 92, and the counter gear 93 is a counter weight integrated gear in which the counter weight 70 is provided integrally with the gear. Here, when the respective counter weights 70 are distinguished, the counterweight 70 of the transmission gear 91 is referred to as a gear weight 101. Further, the counter weight 70 of the output gear 92 is referred to as a first gear weight 102, and the counter weight 70 of the counter gear 93 is referred to as a second gear weight 103.

In the seventh example, the gear weight 101 is a portion protruding in the axial direction L from the transmission gear 91. In FIG. 12, the gear weights 101 are provided at two positions on the axial first side L1 and the axial second side L2 with respect to the transmission gear 91. In the seventh example, the first gear weight 102 and the second gear weight 103 are also portions protruding in the axial direction L from the output gear 92 and the counter gear 93, respectively. In FIG. 12, the first gear weight 102 is provided at a position on the axial first side L1 with respect to the output gear 92. Although the position of the second gear weight 103 with respect to the counter gear 93 is not illustrated, it is preferable to arrange the position in the same position relationship as that of the output gear 92 and the first gear weight 102. For example, when the first gear weight 102 is disposed on the axial first side L1 with respect to the output gear 92 as described above, it is preferable that the second gear weight 103 is also disposed on the axial first side L1 with respect to the counter gear 93. According to the configuration, it is easy to reduce the dimension of the reciprocating internal combustion engine 10 in the axial direction L.

The first gear weight 102 is provided on the output gear 92 so that a magnitude of the moment about the output axis X4 is the same as a magnitude of the moment about the counter axis X5 caused by the second gear weight 103. In the example shown in FIG. 11, a distance from the output axis X4 to the gravity center position of the first gear weight 102 is the same as a distance from the counter axis X5 to the gravity center position of the second gear weight 103. Further, the first gear weight 102 has a mass same as that of the second gear weight 103.

The gear weight 101 is provided on the transmission gear 91 such that the moment thereof about the carrier axis X1 is in the opposite direction to and of the same magnitude as the sum of the moment about the output axis X4 by the first gear weight 102 and the moment about the counter axis X5 by the second gear weight 103. Therefore, in the seventh example, the distance from the carrier axis X1 to the gravity center position of the gear weight 101 is the same as the distance from the output axis X4 to the gravity center position of the first gear weight 102 (from the counter axis X5, the gravity center position of the second gear weight 103). Further, the mass of the gear weights 101 is the same as the total of the mass of the first gear weight 102 and the mass of the second gear weight 103. That is, the mass of the gear weights 101 is twice the mass of each of the first gear weight 102 and the second gear weight 103.

In the reciprocating internal combustion engine 10 in the seventh example, in a state in which the piston body 82 is positioned at each of the top dead center and the bottom dead center, the resultant force of the centrifugal forces acting on the gear weights 101, the first gear weights 102, and the second gear weights 103 is set such that the resultant force of the centrifugal forces acting on the gear weights 101, the first gear weights 102, and the second gear weights 103 is in an opposite direction to and of the same magnitude as a resultant force of the inertial force acting on the piston member 8 and the centrifugal force acting on the crank member 2. Therefore, the mass of the gear weights 101, the first gear weights 102, and the second gear weights 103 is determined in consideration of the inertial force acting on the piston body 82 in a state in which the piston body 82 is positioned at each of the top dead center and the bottom dead center, and the centrifugal force of the crank member 2. According to the configuration, it is possible to effectively reduce the vibration that occurs due to the reciprocating motion of the piston member 8 and the crank member 2.

For example, as shown in FIG. 11, in a state in which the piston body 82 is positioned at the top dead center, the respective gravity center positions of the gear weights 101, the first gear weights 102, and the second gear weights 103 are positioned on the reciprocating direction second side I2 with respect to the respective rotation centers. Specifically, the gravity center position of the gear weight 101 is positioned on the reciprocating direction second side I2 of the carrier axis X1, the gravity center position of the first gear weight 102 is positioned on the reciprocating direction second side I2 of the output axis X4, and the gravity center position of the second gear weight 103 is positioned on the reciprocating direction second side I2 of the counter axis X5. Therefore, the centrifugal force acts on each of the gear weight 101, the first gear weight 102, and the second gear weight 103 in the reciprocating direction second side I2. Further, since the crank member 2 is positioned on the reciprocating direction first side I1 with respect to the carrier axis X1, which is a rotation center of the crank member 2, a centrifugal force acts on the reciprocating direction first side I1. In addition, as shown in FIG. 11, an inertial force toward the reciprocating direction first side I1 acts on the piston body 82 positioned at the top dead center.

On the other hand, as shown in FIG. 13, in a state in which the piston body 82 is positioned at the bottom dead center, the respective gravity center positions of the gear weight 101, the first gear weight 102, and the second gear weight 103 are positioned on the reciprocating direction first side I1 with respect to the respective rotation centers. Therefore, the centrifugal force acts on each of the gear weight 101, the first gear weight 102, and the second gear weight 103 in the reciprocating direction first side I1. Further, the crank member 2 is positioned on the reciprocating direction second side I2 with respect to the carrier axis X1, which is a rotation center of the crank member 2, a centrifugal force acts on the reciprocating direction second side I2. In addition, as shown in FIG. 13, an inertial force toward the reciprocating direction second side I2 acts on the piston body 82 positioned at the bottom dead center.

Further, as shown in FIGS. 11 and 13, in the reciprocating internal combustion engine 10 in the seventh example, the output axis X4 is disposed on the width direction first side H1 with respect to the carrier axis X1 and at the position in the same reciprocating direction I as the carrier axis X1 or at the position on the reciprocating direction first side I1. The output axis X4 illustrated in FIGS. 11 and 13 is disposed on the width direction first side H1 and at a position on the reciprocating direction first side I1 with respect to the carrier axis X1. On the other hand, the counter axis X5 is disposed on the width direction second side H2 with respect to the carrier axis X1, and is disposed at the same position in the reciprocating direction I as the carrier axis X1, or at a position on the reciprocating direction first side I1 with respect to the carrier axis X1 in the reciprocating direction I. The counter axis X5 illustrated in FIGS. 11 and 13 is disposed on the width direction second side H2 and at a position on the reciprocating direction first side I1 with respect to the carrier axis X1.

In the examples shown in FIGS. 11 and 13, when viewed in the axial direction, the output axis X4 and the counter axis X5 are in line symmetry with respect to the reciprocating drive axis Y which serves as the symmetry axis. Therefore, the first counter gear 71 and the second counter gear 72 are disposed at positions in line symmetry with respect to the reciprocating drive axis Y, which serves as the symmetry axis, when viewed in the axial direction.

Figure 15:
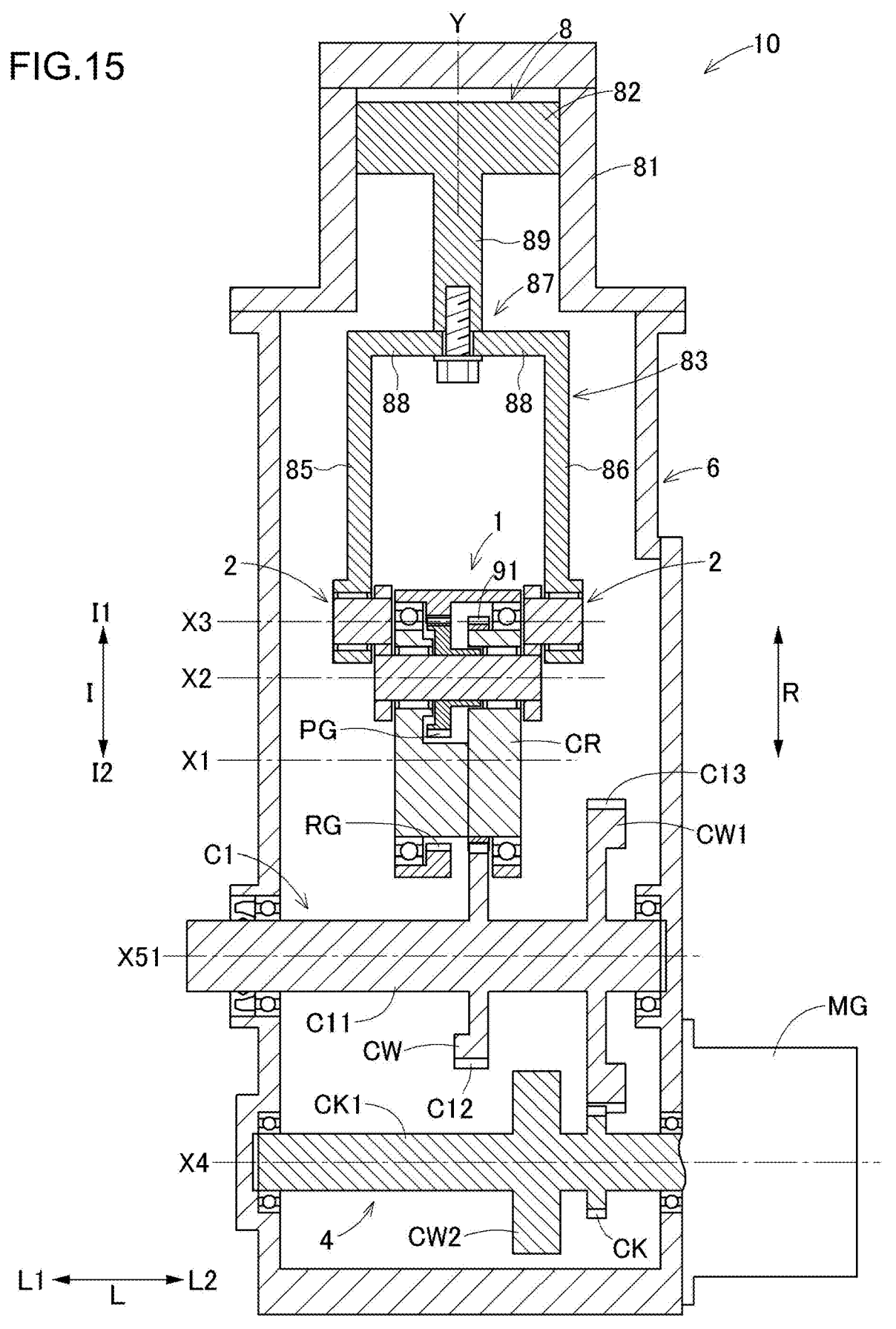
Figure 17:
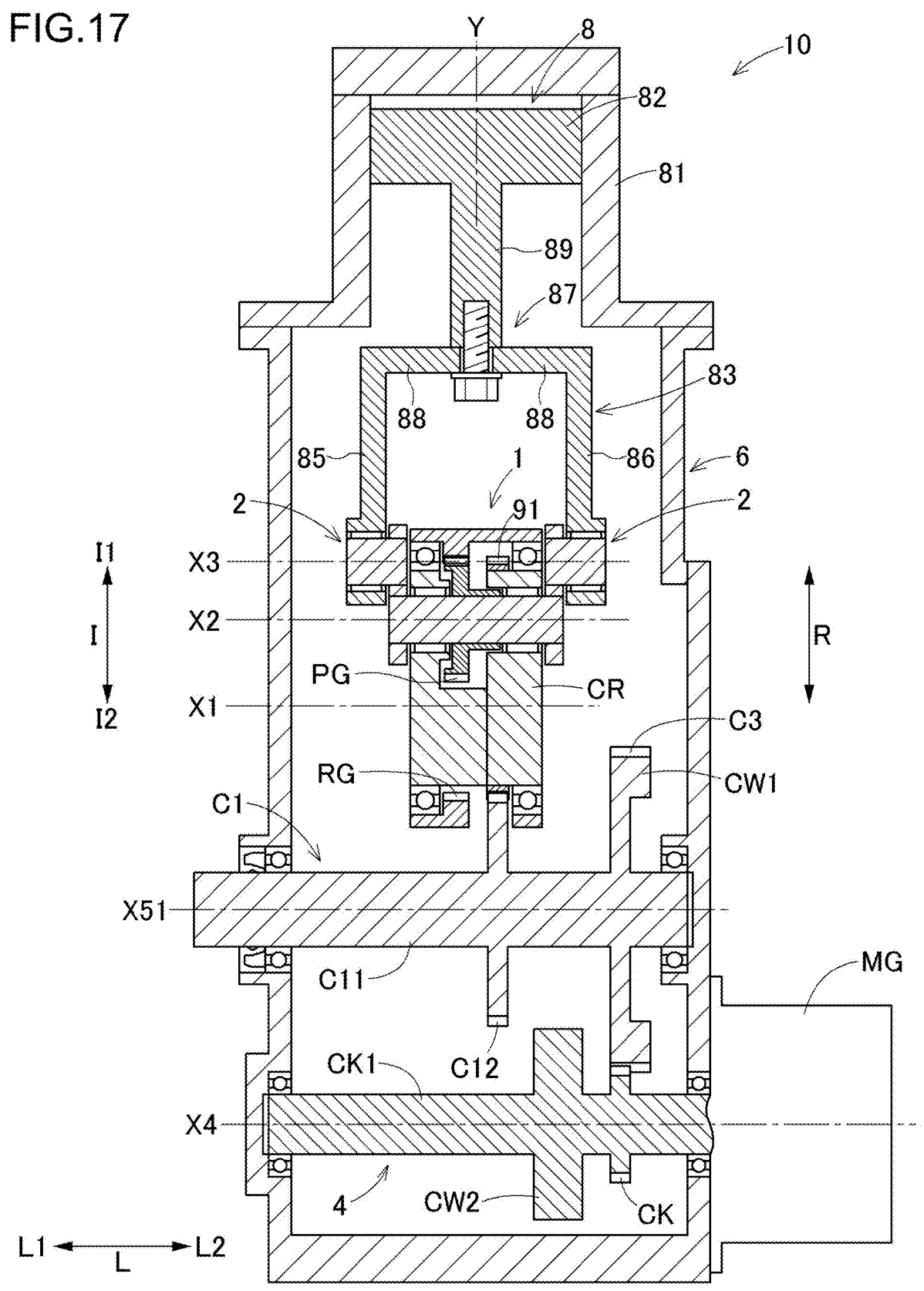
FIG. 17 is a schematic axial cross-sectional view of the reciprocating internal combustion engine in the ninth example (a cross-sectional view taken along line XVII-XVII of FIG. 16).

In the reciprocating internal combustion engine 10, it is preferable that a rotational speed of the output member 4 is different from a rotational speed of a rotating element included in the transmission mechanism 9 such as the transmission gear 91, in addition to the reduction of the vibration caused by the reciprocating motion of the piston member 8 and the like. In particular, as shown in FIG. 15 and FIG. 17, in the reciprocating internal combustion engine 10 that outputs a rotational force of the output member 4 to a generator MG, it is preferable to rotate the generator MG at a rotational speed higher than the rotational speed at which the reciprocating unit 5 rotates the carrier CR. By doing so, it is easy to set the generator MG that outputs a rotational force to the reciprocating internal combustion engine 10 to one with high power generation efficiency. Therefore, as eighth and ninth examples, the rotational speed of the output member 4 is made different from the rotational speed of the rotating element included in the transmission gear 91 and the like, in addition to reducing the vibration caused by the reciprocating motion of the piston member 8 and the like.

Figure 14:
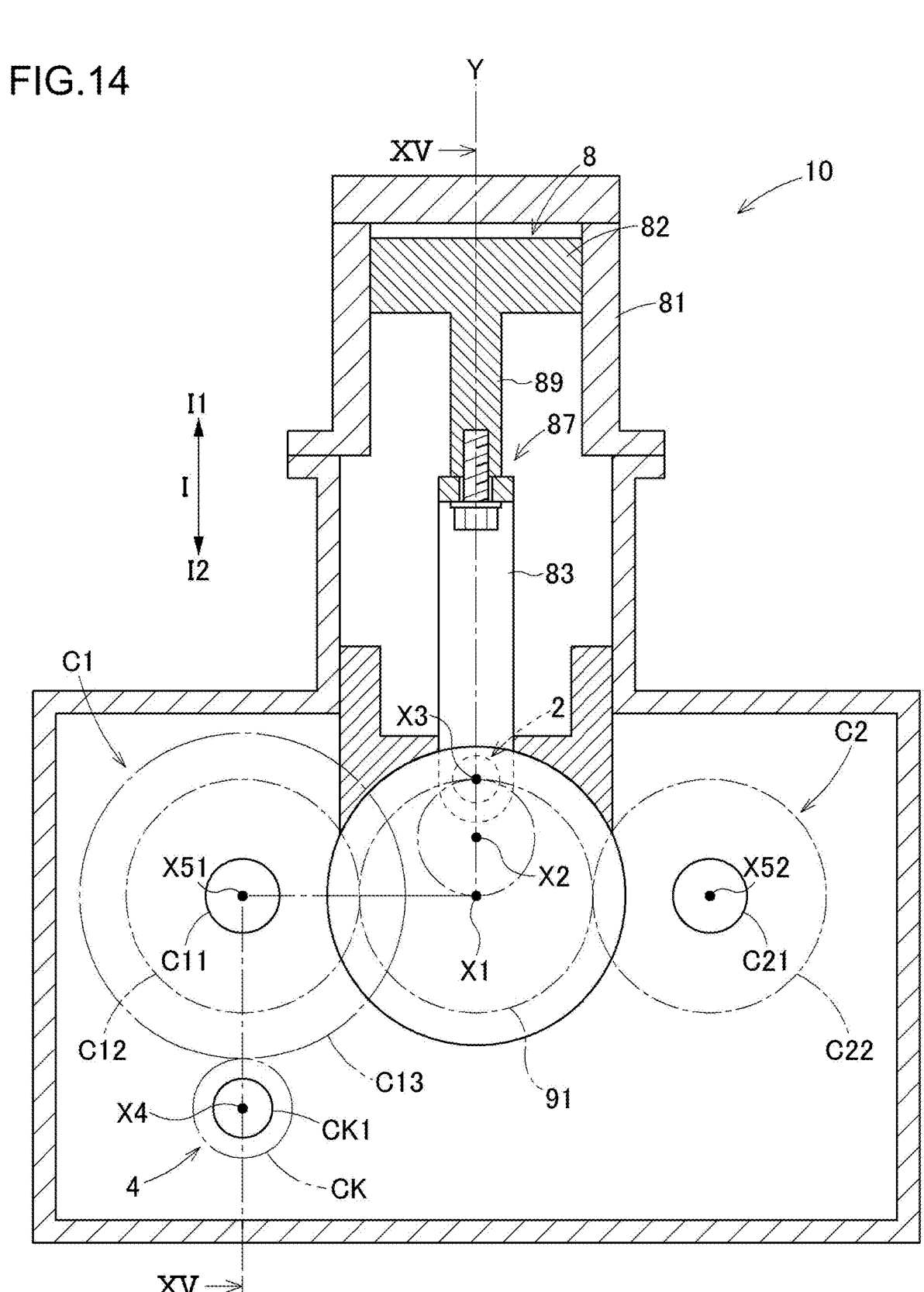
FIG. 14 is a schematic orthogonal axial cross-sectional view of the reciprocating internal combustion engine in an eighth example (another form of FIG. 8)
Figure 16:
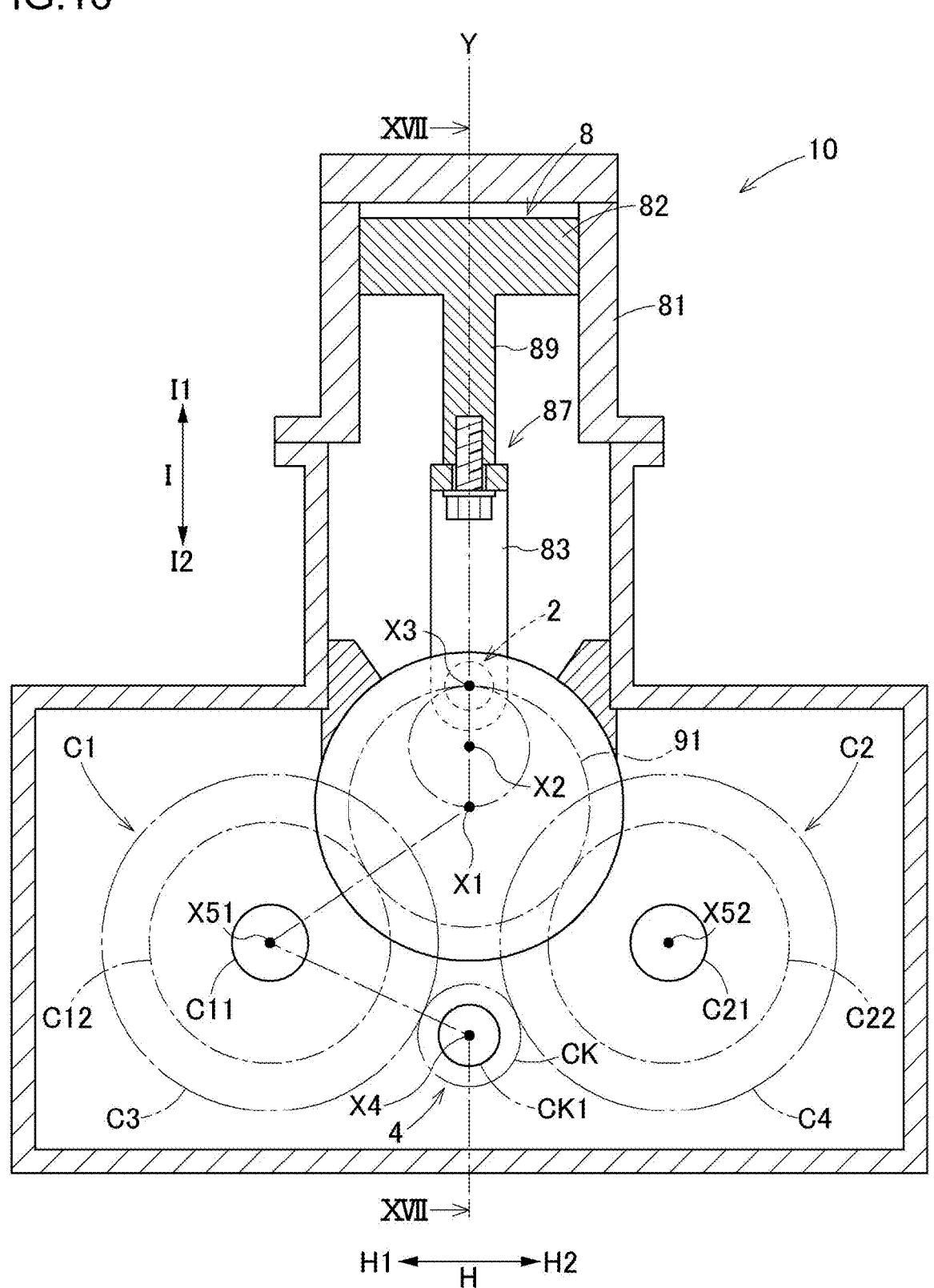
FIG. 16 is a schematic orthogonal axial cross-sectional view of the reciprocating internal combustion engine in a ninth example (another form of FIG. 8)

Hereinafter, the reciprocating internal combustion engine 10 in the eighth example and the ninth example will be described with reference to FIGS. 14 to 17. Here, FIGS. 14 and 15 show the reciprocating internal combustion engine 10 in the eighth example. FIG. 14 is a schematic orthogonal axial cross-sectional view of the reciprocating internal combustion engine 10 in the eighth example, and FIG. 15 is a cross-sectional view taken along line XV-XV of FIG. 14. FIGS. 16 and 17 show the reciprocating internal combustion engine 10 in the ninth example. FIG. 16 is a schematic orthogonal axial cross-sectional view of the reciprocating internal combustion engine 10 in the ninth example, FIG. 17 is a cross-sectional view taken along line XVII-XVII in FIG. 16. The reciprocating internal combustion engines 10 in the eighth and ninth examples are different from the reciprocating internal combustion engines 10 in the fifth and seventh examples in the configuration of the power transmission mechanism 9. Hereinafter, differences between the configurations of the reciprocating internal combustion engines 10 in the eighth and ninth examples and the configurations of the reciprocating internal combustion engines 10 in the fifth to seventh examples will be mainly described. Further, a description of configurations common to the reciprocating internal combustion engines 10 in the eighth and ninth examples and the reciprocating internal combustion engines 10 in the fifth to seventh examples will be omitted.

In the reciprocating internal combustion engine 10 in the eighth example, as shown in FIGS. 14 and 15, the transmission mechanism 9 includes the transmission gear 91, a first counter mechanism C1, a second counter mechanism C2, and an output gear CK. Also in the reciprocating internal combustion engine 10 in the eighth example, the transmission gear 91 rotates integrally with the carrier CR. In addition, in the reciprocating internal combustion engine 10 in the eighth example, the generator MG is drivingly coupled to the output member 4.

The first counter mechanism C1 includes a first counter shaft C11 rotatably supported about a first counter axis X51 parallel to the carrier axis X1, and a first counter gear C12 that meshes with the transmission gear 91 and rotates integrally with the first counter shaft C11. In the example shown in FIG. 14, the first counter shaft C11 is disposed on the width direction first side H1 with respect to the reciprocating drive axis Y Further, both end portions of the first counter shaft C11 in the axial direction L are rotatably supported by the case 6 via bearings, respectively. The first counter gear C12 is disposed on an outer peripheral surface of the first counter shaft C11 at a position overlapping the transmission gear 91 when viewed in the radial direction R and at an intermediate position in the axial direction L. In the example shown in FIG. 15, the first counter gear C12 is integrated with the first counter shaft C11.

In the example shown in FIG. 15, a weight CW is provided in at least a partial region in a circumferential direction around the first counter axis X51 on an outer end portion of the first counter gear C12 in the radial direction R. The weight CW is a weight provided to adjust a magnitude of the moment of inertia generated by the rotation of the first counter gear C12. In the example shown in FIG. 15, the weight CW has an integral structure with the first counter gear C12 and is formed on a surface of the first counter gear on the axial first side L1. A region where the weight CW is formed in the first counter gear C12 and a weight of the weight CW are appropriately determined according to the magnitude of the moment of inertia required to reduce the vibration of the entire reciprocating internal combustion engine 10.

The second counter mechanism C2 includes a second counter shaft C21 rotatably supported about a second counter axis X52 parallel to the carrier axis X1, and a second counter gear C22 that meshes with the transmission gear 91 and rotates integrally with the second counter shaft C21. In the example shown in FIG. 14, the second counter shaft C21 is disposed on the width direction second side H2 with respect to the reciprocating drive axis Y. Although not shown, similarly to the first counter shaft C11, both end portions of the second counter shaft C21 in the axial direction L are also rotatably supported by the case 6 via bearings, respectively. Although not shown, similarly to the first counter gear C12, the second counter gear C22 is also disposed on the outer peripheral surface of the second counter shaft C21 at a position overlapping with the transmission gear 91 when viewed in the radial direction R and at an intermediate position in the axial direction L. Further, similarly to the first counter gear C12, the second counter gear C22 is also integrated with the second counter shaft C21.

In the eighth example, although not shown, the second counter gear C22 is also provided with the weight CW in at least a partial region in the circumferential direction around the second counter axis X52, similarly to the first counter gear C12. By providing the weights CW on both the first counter gear C12 and the second counter gear C22, at least a part of the moment of inertia generated in the first counter gear C12 can be cancelled by the moment of inertia generated in the second counter gear C22. Therefore, the vibration generated in the reciprocating internal combustion engine 10 can be reduced.

When the output gear CK meshes with at least one of a gear that rotates integrally with the first counter shaft C11 and a gear that rotates integrally with the second counter shaft C21, the output gear CK rotates integrally with the output member 4. In the eighth example, the output member 4 includes an output shaft CK1 disposed along the output axis X4 in addition to the output gear CK. In the example shown in FIG. 15, the output axis X4 is disposed on the width direction first side H1 with respect to the reciprocating drive axis Y. In addition, the output axis X4 is disposed on the reciprocating direction second side I2 with respect to the carrier axis X1.

In the example shown in FIG. 15, the output gear CK is provided on the outer peripheral surface of the output shaft CK1. Both end portions of the output shaft CK1 in the axial direction L are rotatably supported by the case 6 via bearings, respectively. In the example shown in FIG. 15, the output gear CK is formed at an intermediate position of the output shaft CK1 in the axial direction L. Further, the output gear CK is integrated with the output shaft CK1.

In the example shown in FIGS. 14 and 15, the output gear CK meshes with an intermediate gear C13 that rotates integrally with the first counter shaft C11 or the second counter shaft C21. In the example shown in FIG. 15, the intermediate gear C13 is disposed at a different position in the axial direction L with respect to the first counter gear C12. Specifically, the intermediate gear C13 is disposed at a position on the outer peripheral surface of the first counter shaft C11 and on the axial second side L2 with respect to the first counter gear C12. In the example shown in FIG. 15, the intermediate gear C13 is integrated with the first counter shaft C11. In addition, the intermediate gear C13 is disposed on the axial second side L2 with respect to the planetary gear mechanism 1. Therefore, it is easy to secure a space in the radial direction R with respect to an installation position of the intermediate gear C13 in the axial direction L, and it is easy to set the intermediate gear C13 to be large in the radial direction R. Therefore, it is easy to set a reduction ratio of the rotation of the first counter shaft C11 with respect to the rotation of the output shaft CK1 to a relatively large value.

At least one of the first counter mechanism C1 and the second counter mechanism C2 is preferably provided with an intermediate weight CW1. The intermediate weight CW1 is a weight having at least one of a function of adjusting the moment of inertia of the first counter shaft C11 or the second counter shaft C21 and a function of preventing a sudden change in the rotation of the intermediate gear C13 as a flywheel. In the example shown in FIG. 15, the intermediate weight CW1 is provided on the intermediate gear C13. Specifically, the intermediate weight CW1 is provided on a surface on the axial second side L2 of an outer end portion of the intermediate gear C13 in the radial direction R. Further, the intermediate weight CW1 is provided in at least a partial region in the circumferential direction around a rotational axis of the intermediate gear C13. In the example shown in FIG. 15, the intermediate weight CW1 has an integral structure with the intermediate gear C13, and is disposed over the entire circumference in the circumferential direction. Therefore, the intermediate weight CW1 can have both a function of adjusting the moment of inertia of the first counter shaft C11 and a function as a flywheel.

The output member 4 is implemented such that the moment of inertia (an output moment of inertia) of a member rotating about the carrier axis X1 and a member rotating about the output axis X4 and the moment of inertia (a counter moment of inertia) of a member rotating about the first counter axis X51 and a member rotating about the second counter axis X52 cancel each other. In the eighth example, the output moment of inertia and the counter moment of inertia are made to be balanced. Specifically, the output member 4 includes an output weight CW2 that is a weight for adjusting the magnitude of the output moment of inertia.

An installation position, a magnitude, and a range of the output weight CW2 with respect to the output member 4 are set such that the output moment of inertia is balanced with the counter moment of inertia. In the example shown in FIG. 15, the output weight CW2 is provided on the outer peripheral surface of the output shaft CK1. In addition, the output weight CW2 is disposed on the axial first side L1 with respect to the output gear CK at an interval, and is disposed in a region between the first counter gear C12 and the intermediate gear C13. According to the configuration, an installation space of the output gear CK in the radial direction R is easily secured, and the magnitude of the output moment of inertia is easily adjusted.

In the transmission mechanism 9 described above, a gear ratio of the output gear CK and the gears meshing with the output gear CK is preferably set such that the rotational speed of the output member 4 is faster than the rotational speeds of the first counter shaft C11 and the second counter shaft C21. According to the configuration, the output member 4 can rotate the generator MG at a high rotational speed. In the example shown in FIG. 15, the rotational speed of the output member 4 is faster than the rotational speed of the first counter shaft C11. Specifically, in the example shown in FIG. 15, the rotation of the first counter shaft C11 is transmitted from the intermediate gear C13 that meshes with the output gear CK, and a diameter of the intermediate gear C13 is set to be larger than that of the output gear CK. Further, in the example shown in FIG. 15, since the output shaft CK1 rotates at a high rotational speed, the output shaft CK1 is implemented to rotate integrally with a rotor of the generator MG. That is, the output shaft CK1 is drivingly coupled to the rotor of the generator MG.

As shown in FIGS. 16 and 17, the reciprocating internal combustion engine 10 in the ninth example is different from the reciprocating internal combustion engine 10 in the eighth example in the configurations of the first counter mechanism C1, the second counter mechanism C2, and the output member 4. Hereinafter, differences between the reciprocating internal combustion engine 10 in the ninth example and the reciprocating internal combustion engine 10 in the eighth example will be described, and a description of the configurations common to the reciprocating internal combustion engine 10 in the ninth example and the reciprocating internal combustion engine 10 in the eighth example will be omitted.

In the reciprocating internal combustion engine 10 in the ninth example, as shown in FIGS. 16 and 17, the first counter mechanism C1 further includes a third counter gear C3 that is disposed at a position different from the first counter gear C12 in the axial direction L and rotates integrally with the first counter shaft C11. Specifically, the third counter gear C3 is disposed at a position on the outer peripheral surface of the first counter shaft C11 and on the axial second side L2 with respect to the first counter gear C12. In the example shown in FIG. 17, the third counter gear C3 is integrated with the first counter shaft C11. In addition, the third counter gear C3 is disposed on the axial second side L2 with respect to the planetary gear mechanism 1. Therefore, it is easy to secure a space in the radial direction R with respect to an installation position of the third counter gear C3 in the axial direction L, and it is easy to set the third counter gear C3 to be large in the radial direction R. Therefore, it is easy to set a reduction ratio of the rotation of the first counter shaft C11 with respect to the rotation of the output shaft CK1 to a relatively large value.

The second counter mechanism C2 further includes a fourth counter gear C4 that is disposed at a position different from the second counter gear C22 in the axial direction L and rotates integrally with the second counter shaft C21. Specifically, although not shown, the fourth counter gear C4 is disposed at a position on the outer peripheral surface of the second counter shaft C21 and on the axial second side L2 with respect to the second counter gear C22. Further, the fourth counter gear C4 is integrated with the second counter shaft C21. In addition, the fourth counter gear C4 is disposed on the axial second side L2 with respect to the planetary gear mechanism 1. Therefore, it is easy to secure a space in the radial direction R with respect to an installation position of the fourth counter gear C4 in the axial direction L, and it is easy to set the fourth counter gear C4 to be large in the radial direction R. Therefore, it is easy to match the dimension of the fourth counter gear C4 in the radial direction R with the dimension of the third counter gear C3 in the radial direction R, and it is easy to adjust the magnitude of the counter moment of inertia.

The first counter mechanism C1 and the second counter mechanism C2 are preferably disposed in a positional relationship of line symmetry in the width direction H with the reciprocating drive axis Y as a target axis. According to the configuration, the moment of inertia of the member rotating about the first counter axis X51 and the moment of inertia of the member rotating about the second counter axis X52 are easily made to cancel each other. Therefore, the vibration of the reciprocating internal combustion engine 10 is easily reduced.

In the ninth example, the output gear CK is implemented to mesh with both the third counter gear C3 and the fourth counter gear C4. According to the configuration, since the output gear CK meshes with both the third counter gear C3 and the fourth counter gear C4, an offset load in the radial direction R acting on the output gear CK and the output member 4 can be kept small. Therefore, it is easy to reduce the weight of the output gear CK and the output member 4.

Next, other embodiments of the reciprocating internal combustion engine 10 will be described.

Other Embodiments (1) In the above embodiment, the generator MG is drivingly coupled to the output member 4. Here, in the present specification, the term "drivingly coupled" refers to a state in which two rotating components are coupled such that a driving force can be transmitted, and includes a state in which the two rotating components are coupled to rotate integrally or a state in which the two rotating components are coupled such that a driving force can be transmitted via one or two or more transmission members. Examples of such a transmission member include various members that transmit the rotation at the same speed or at variable speeds, such as shafts, gear mechanisms, belts, and chains. Examples of the transmission member may include an engagement device that selectively transmits the rotation and the driving force, such as a friction engagement device and a meshing type engagement device.

(2) In the eighth and ninth examples, the generator MG is drivingly coupled to the output member 4. However, the component that is drivingly coupled to the output member 4 is not limited to the generator MG, and any device capable of outputting the rotational force generated by the reciprocating unit 5 may be used. For example, a device that directly uses the rotational force generated by the reciprocating unit 5 as power may be drivingly coupled to the output member 4.

(3) In the eighth example, the output gear CK meshes with the intermediate gear C13 that rotates integrally with the first counter shaft C11. However, the output gear CK is not limited to the configuration that meshes with the intermediate gear C13, and may have a configuration that meshes with at least one of the gear that rotates integrally with the first counter shaft C11 and the gear that rotates integrally with the second counter shaft C21. For example, the output gear CK may be implemented to mesh with the first counter gear C12 or the second counter gear C22.

(4) In the eighth example, the installation position, the magnitude, and the range of the output weight CW2 with respect to the output member 4 are set such that the output moment of inertia is balanced with the counter moment of inertia. However, the installation position, the magnitude, and the range of the output weight CW2 may not be set such that the output moment of inertia is completely balanced with the counter moment of inertia. That is, the installation position, the magnitude, and the range of the output weight CW2 may be set such that the output moment of inertia cancels a part of the counter moment of inertia.

(5) In the reciprocating internal combustion engine 10 in the eighth example, the output shaft center X4 is disposed on the width direction first side H1 with respect to the reciprocating drive shaft Y, and the output gear CK meshes with the intermediate gear C13. However, the output shaft center X4 may be disposed on the width direction second side H2 with respect to the reciprocating drive axis Y. In this case, the output member 4 may mesh with the second counter gear C22. Further, for example, the second counter gear C22 may be implemented to mesh with both the output gear CK provided on the output member 4 and the transmission gear 91. A configuration corresponding to the intermediate gear 13 may be provided in the second counter gear C22 such that the transmission gear 91 and the second counter gear C22 mesh with each other and the intermediate gear 13 provided in the second counter shaft C21 and the output gear CK mesh with each other.

(6) In the reciprocating internal combustion engines 10 in the eighth and ninth examples, the first counter axis X51 and the second counter shaft X52 are disposed at the same position in the reciprocating direction I or a position on the reciprocating direction second side I2 with respect to the carrier axis X1. However, at least one of the first counter axis X51 and the second counter axis X52 may be disposed at a position on the reciprocating direction first side I1 with respect to the carrier axis X1.

(7) The configurations disclosed in the embodiment described above can be applied in combination with configurations disclosed in other embodiments as long as no contradiction occurs. Regarding other configurations, the embodiment disclosed in the present specification is merely an example in all respects. Therefore, various modifications can be made as appropriate without departing from the spirit of the present disclosure.

Hereinafter, the reciprocating internal combustion engine (10) described above will be briefly summarized.

In one embodiment, a reciprocating internal combustion engine (10) includes: a planetary gear mechanism (1) including a ring gear (RG) that is an internal gear, a carrier (CR) that is rotatably supported with respect to the ring gear (RG), and a planetary gear (PG) that is rotatably supported with respect to the carrier (CR) and meshes with the ring gear (RG), a crank member (2) coupled to the planetary gear (PG) to rotate integrally with the planetary gear (PG), with a direction along a carrier axis (X1) which is a rotation axis of the carrier (CR) being defined as an axial direction (L), a direction orthogonal to the carrier axis (X1) being defined as a radial direction (R), and a direction orthogonal to a planetary axis (X2) which is a rotation axis of the planetary gear (PG) being defined as a planetary radial direction (Rp), a piston member (8) coupled to the crank member (2) to be relatively rotatable about an input axis (X3) set at a position separately from the planetary axis (X2) in the planetary radial direction (Rp), and a transmission mechanism (9) configured to transmit a rotation of the carrier (CR) to an output member (4). A radius (r1) of the ring gear (RG) is twice a radius (r2) of the planetary gear (PG). A pair of planetary bearings (1) are disposed separately on both sides of the planetary gear (PG) in the axial direction (L) to rotatably support the planetary gear (PG) with respect to the carrier (CR). A pair of carrier bearings (B2) are disposed separately on both sides of the ring gear (RG) in the axial direction (L) to rotatably support the carrier (CR) with respect to the ring gear (RG). The crank member (2) includes a first crank portion (21) and a second crank portion (22) which are a pair of crank portions disposed separately on both sides of the carrier (CR) in the axial direction (L). The piston member (8) includes a piston body (82) and a pair of coupling portions (83) including a first coupling portion (85) and a second coupling portion (86) that are coupled to the piston body (82) and disposed separately on both sides of the carrier (CR) in the axial direction (L). The first crank portion (21) and the second crank portion (22) are disposed to extend in the planetary radial direction (Rp). The first coupling portion (85) is coupled to the first crank portion (21) to be relatively rotatable about the input axis (X3), and the second coupling portion (86) is coupled to the second crank portion (22) to be relatively rotatable about the input axis (X3).

According to the configuration, the reciprocating motion of the piston member (8) can be converted into a rotational motion of the output member (4) and output. According to the configuration, the planetary gear (PG) is rotatably supported with respect to the carrier (CR) at both sides in the axial direction (L), and the carrier (CR) is rotatably supported with respect to the ring gear (RG) at both sides in the axial direction (L). Therefore, even when a load biased in the axial direction (L) acts on the planetary gear (PG) via the crank member (2), the load can be appropriately supported. Therefore, it is easy to extend a life of the planetary gear mechanism (1) and the transmission mechanism (9) compared to when the planetary gear (PG) or the like is supported in a cantilever manner. Further, according to the configuration, since the pair of coupling portions (83) of the piston member (8) and the pair of crank portions (2) are separately disposed on both sides of the carrier (CR) in the axial direction (L), and the pair of coupling portions (83) and the pair of crank portions (2) are coupled to each other to be relatively rotatable about the input axis (X3), it is easy to ensure rigidity of a support structure of the piston member (8), and it is easy to stabilize operations of the piston member (8) and the crank member (2). According to such a configuration, it is possible to provide a reciprocating internal combustion engine (10) that can ensure rigidity of a linear motion conversion mechanism that converts a linear motion of a piston into a rotational motion and can achieve a stable operation.

In the reciprocating internal combustion engine (10), it is preferable that the radius (r2) of the planetary gear (PG) is equal to a distance (d23) between the planetary axis (X2) and the input axis (X3) in the planetary radial direction (Rp), and the first coupling portion (85) and the second coupling portion (86) are integrally coupled to the piston body (82).

According to the configuration, a locus of the reciprocating motion of the input axis (X3) can be made linear, and accordingly, the piston body (82) and the pair of coupling portions (83) can be integrally coupled. Therefore, it is easy to increase the rigidity of the piston member (8), and it is easy to further stabilize the operations of the piston member (8) and the crank member (2).

In the reciprocating internal combustion engine (10), it is preferable that, a direction in which the piston body (82) reciprocates is defined as a reciprocating direction (I), the first coupling portion (85) and the second coupling portion (86) are integrally coupled to the piston body (82) via an intermediate coupling portion (87), the intermediate coupling portion (87) includes an axial coupling portion (88) that couples the first coupling portion (85) and the second coupling portion (86) in the axial direction (L), and a reciprocating direction coupling portion (89) that couples the axial coupling portion (88) and the piston body (82) in the reciprocating direction (I), a dimension (d88) of the axial coupling portion (88) in the axial direction (L) is larger than a dimension (d82) of the piston body (82) in the axial direction (L), and the reciprocating direction coupling portion (89) is formed such that a cross section orthogonal to the reciprocating direction (I) is smaller than that of the piston body (82).

According to the configuration, it is easy to ensure a large dimension of the crank member (2) and the planetary gear mechanism (1) supporting the piston body (82) in the axial direction (L). Since restrictions on the arrangement of the bearings can be reduced, the piston member (8) can be appropriately supported even when the load from the piston member (8) is large.

In the reciprocating internal combustion engine (10), it is preferable that the transmission mechanism (9) includes a transmission gear (91) that rotates integrally with the carrier (CR), and an output gear (92) that meshes with the transmission gear (91) and rotates integrally with the output member (4), the output gear (92) and the output member (4) are rotatably supported about an output axis (X4) parallel to the carrier axis (X1), and the transmission gear (91) and the output gear (92) are disposed between the pair of carrier bearings (B2) in the axial direction (L).

In a structure in which a rotation is transmitted from the carrier (CR) to the output member (4) via the transmission gear (91) and the output gear (92), a degree of freedom of arrangement of the output member (4) is easily increased. In the structure, since the transmission gear (91) and the output gear (92) are disposed between the pair of carrier bearings (B2), rigidity of the support structure for the transmission gear (91) and the output gear (92) can also be easily ensured.

It is preferable that the reciprocating internal combustion engine (10) further includes a pair of the reciprocating units (5), each of the reciprocating unit (5) being a set of the planetary gear mechanism (1), the crank member (2), and the piston member (8), the transmission mechanism (9) includes a pair of the transmission gears (91), one of the pair of the transmission gears (91) is a first transmission gear (91a) that rotates integrally with the carrier (CR (CR1)) of one (5A) of the pair of reciprocating units (5), the other of the pair of the transmission gears (91) is a second transmission gear (91b) that rotates integrally with the carrier (CR (CR2)) of the other (5B) of the pair of reciprocating units (5), the output gear (92) meshes with both the first transmission gear (91a) and the second transmission gear (91b), and the output axis (X4) is disposed at a position different from a line (B) connecting the carrier axes (X1 (X11, X12)) of the pair of reciprocating units (5) as viewed in the axial direction (L).

According to the configuration, as compared with the configuration in which the output axis (X4) is disposed on a line connecting the carrier axes (X1 (X11, X12)) of the planetary gear mechanisms (1) of the pair of reciprocating units (5), a distance between the carrier axes (X1 (X11, X12)) of the pair of reciprocating units (5) can be made close. Therefore, it is easy to reduce the size of the reciprocating internal combustion engine (10) including the pair of reciprocating units (5).

In addition, it is preferable that the reciprocating internal combustion engine (10) further includes a pair of reciprocating units (5) disposed side by side in the axial direction (L), each of the reciprocating units (5) being a set of the planetary gear mechanism (1), the crank member (2), and the piston member (8). The transmission mechanism (9) includes a pair of the transmission gears (91) and a pair of output gears (92), one of the pair of the transmission gears (91) is a first transmission gear (91a) that rotates integrally with the carrier (CR (CR1)) of one (5A) of the pair of reciprocating units (5), the other of the pair of the transmission gears (91) is a second transmission gear (91b) that rotates integrally with the carrier (CR (CR2)) of the other (5B) of the pair of reciprocating units (5), one of the pair of the output gears (92) is a first output gear (92a) that meshes with the first transmission gear (91a), the other of the pair of the output gears (92) is a second output gear (92b) that meshes with the second transmission gear (91b), and the first output gear (92a) and the second output gear (92b) are disposed side by side on the output axis (X4) in the axial direction (L), and are each coupled to the output member (4) to rotate integrally with the output member (4).

According to the configuration, in the configuration in which the piston member (8) is disposed in series, the pair of output gears (92 (92a, 92b)) arranged in the axial direction (L) can be more easily coupled to the output member (4). Therefore, it is easy to reduce the size of the reciprocating internal combustion engine (10) in which the piston member (8) is disposed in series.

In the reciprocating internal combustion engine (10), it is preferable that the transmission mechanism (9) includes a transmission gear (91) that rotates integrally with the carrier (CR), and an output gear (92) that meshes with the transmission gear (91) and rotates integrally with the output member (4), the output member (4) includes a first counter gear (71) that is rotatably supported about an output axis (X4) parallel to the carrier axis (X1) and rotates integrally with the output member (4), a counter mechanism including a counter shaft (7) rotatably supported about a counter axis (X5) parallel to the carrier axis (X1), and a second counter gear (72) that meshes with the first counter gear (71) and rotates integrally with the counter shaft (7) is further provided, when a direction in which the piston body (82) reciprocates is defined as a reciprocating direction (I), a direction orthogonal to the reciprocating direction (I) and the axial direction (L) is defined as a width direction (H), one side of the width direction (H) is defined as a width direction first side (H1), and the other side is defined as a width direction second side (H2), an axis passing through a center of the piston body (82) as viewed in the reciprocating direction (I) and along the reciprocating direction (I) is defined as a reciprocating drive axis (Y), the output axis (X4) is disposed on the width direction first side (H1) and the counter axis (X5) is disposed on the width direction second side (H2) with the reciprocating drive axis (Y) interposed therebetween, and the first counter gear (71) and the second counter gear (72) are each a counterweight integrated gear in which a counter weight (70) is integrally provided with the gear.

In the reciprocating internal combustion engine (10), it is preferable to reduce a vibration that occurs due to a reciprocating motion. For example, in the case of a configuration in which the output axis (X4) is positioned on the reciprocating drive axis (Y) and the output member (4) is disposed, it is easy to reduce a vibration in a direction along the reciprocating drive axis (Y), but a vibration in the width direction (H) orthogonal to the reciprocating drive axis (Y) and the axial direction (L) tends to remain. According to the configuration, the output axis (X4) and the counter axis (X5) are disposed separately on both sides in the width direction (H) with the reciprocating drive axis (Y) interposed therebetween, the first counter gear (71) disposed on the output axis (X4) and the second counter gear (72) disposed on the counter axis (X5) mesh with each other, and the counter weights (70) are provided to both counter gears. The vibration in the direction along the reciprocating drive axis (Y) can be reduced by a movement of the center of gravity along the reciprocating drive axis (Y) between the counter weight (73 (70)) on the output axis (X4) and the counter weight (74 (70)) on the counter axis (X5). Since the counterweight (73 (70)) on the output axis (X4) and the counter weight (74 (70)) on the counter axis (X5) are separately disposed in the width direction (H), the vibration in the width direction (H) is also easily canceled out, and the vibration can be reduced.

It is preferable that the reciprocating internal combustion engine (10) further includes a first counter weight (75) configured to rotate integrally with the output member (4), and a second counter weight (76) configured to rotate integrally with the counter shaft (7) independently of the first counter weight (75), the first counter gear (71) and the first counter weight (75) are separately disposed on both sides of the reciprocating drive axis (Y) and the output gear (92) in the axial direction (L), and the second counter gear (72) and the second counter weight (76) are separately disposed on both sides of the reciprocating drive axis (Y) in the axial direction (L).

According to the configuration, in addition to the first counter gear (71) and the second counter gear (72), which are the counter weight integrated gears, the vibration in the width direction (H) can be appropriately reduced by the first counter weight (75) and the second counter weight (76). In addition, the first counter gear (71) provided with the counter weight (70) and the first counterweight (75) are disposed separately on both sides of the reciprocating drive axis (Y) in the axial direction (L), and the second counter gear (72) provided with the counter weight (70) and the second counter weight (76) are disposed separately on both sides of the reciprocating drive axis (Y) in the axial direction (L), making it easy to achieve a weight balance in the axial direction (L) and to reduce the vibration in the axial direction (L).

In the reciprocating internal combustion engine (10), it is preferable that the transmission mechanism (9) includes a transmission gear (91) that rotates integrally with the carrier (CR), and an output gear (92) that meshes with the transmission gear (91) and rotates integrally with the output member (4), the output member (4) is rotatably supported about an output axis (X4) parallel to the carrier axis (X1), a counter mechanism including a counter shaft (7) rotatably supported about a counter axis (X5) parallel to the carrier axis (X1) and a counter gear (93) that meshes with the transmission gear (91) and rotates integrally with the counter shaft (7) is further provided, and the transmission gear (91), the output gear (92), and the counter gear (93) are each a counter weight integrated gear in which a counter weight (70) is integrally provided with the gear.

According to the configuration, the vibration that occurs due to the reciprocating motion of the piston body 82 and the rotation of the crank member (2) can be appropriately reduced by the movement of the center of gravity along the reciprocating direction (1) of the transmission gear (91), the output gear (92), and the counter gear (93) which are the counter weight integrated gears. In addition, since the counter gear (93) meshes with the transmission gear (91), the counter gear (93) can be disposed at a position separated from the output gear (92). Therefore, a degree of freedom of arrangement of the output member (4) and the counter shaft (7) is high, and a degree of freedom of an overall shape is easily increased.

In the reciprocating internal combustion engine (10), it is preferable that, a direction in which the piston body (82) reciprocates is defined as a reciprocating direction (1), a direction orthogonal to the reciprocating direction (1) and the axial direction (L) is defined as a width direction (H), one side of the width direction (H) is defined as a width direction first side (H1), and the other side is defined as a width direction second side (H2), the output axis (X4) is disposed on the width direction first side (H1) with respect to the carrier axis (X1) and is positioned at the same position in the reciprocating direction (1) as the carrier axis (X1) or at a position on a piston body (82) side with respect to the carrier axis (X1) in the reciprocating direction (1), the counter axis (X5) is disposed on the width direction second side (H2) with respect to the carrier axis (X1) and is positioned at the same position in the reciprocating direction (1) as the carrier axis (X1) or at a position on the piston body (82) side with respect to the carrier axis (X1) in the reciprocating direction (1), and the transmission gear (91), the output gear (92), and the counter gear (93) are disposed to be positioned between the first coupling portion (85) and the second coupling portion (86) in the axial direction (L).

According to the configuration, the output axis (X4) and the counter axis (X5) are positioned on the piston body (82) side with respect to the same reciprocating direction (1) as the carrier axis (X1) or the carrier axis (X1). It is easy to keep the dimension of the transmission mechanism (9) in the reciprocating direction (1) small compared to when the output axis (X4) and the counter axis (X5) are on the opposite side of the piston body (82) with respect to the carrier axis (X1). In addition, since the transmission gear (91), the output gear (92), and the counter gear (93) are disposed between the first coupling portion (85) and the second coupling portion (86) in the axial direction (L), it is easy to ensure the rigidity of the support structure of each gear when the dimension of the transmission mechanism (9) in the axial direction (L) is easily reduced.

In the reciprocating internal combustion engine (10), it is preferable that the transmission gear (91), the output gear (92), and the counter gear (93) mesh with each other to rotate at the same speed, the counter weight (102 (70)) of the output gear (92) is provided in the output gear (92) so that a magnitude of a moment about the output axis (X4) is equal to a magnitude of a moment about the counter axis (X5) by the counter weight (103 (70)) of the counter gear (93), the counter weight (101 (70)) of the transmission gear (91) is provided in the transmission gear (91) such that a moment about the carrier axis (X1) is in an opposite direction to and of the same magnitude as the sum of the moment about the output axis (X4) by the counter weight (102 (70)) of the output gear (92) and the moment about the counter axis (X5) by the counter weight (103 (70)) of the counter gear (93), and in a state in which the piston body (82) is positioned at a top dead center and a bottom dead center, a resultant force of the centrifugal forces acting on the counter weight (101 (70)) of the transmission gear (91), the counter weight (102 (70)) of the output gear (92), and the counter weight (103 (70)) of the counter gear (93) is set to be in an opposite direction to and of the same magnitude as a resultant force of an inertial force acting on the piston member (8) and a centrifugal force acting on the crank member (2).

According to the configuration, it is possible to effectively reduce the vibration that occurs due to the reciprocating motion of the piston member (8) and the crank member (2).

It is preferable that the reciprocating internal combustion engine (10) is disposed at a position where the carrier axis (X1) intersects with the reciprocating drive axis (Y).

According to the configuration, it is easy to cancel out the vibration in the width direction H of the reciprocating internal combustion engine (10).

In the reciprocating internal combustion engine (10), the transmission mechanism (9) includes a transmission gear (91) that rotates integrally with the carrier (CR), a first counter mechanism (C1) including a first counter shaft (C11) supported rotatably about a first counter axis (X51) parallel to the carrier axis (X1), and a first counter gear (C12) that meshes with the transmission gear (91) and rotates integrally with the first counter shaft (C11), a second counter mechanism (C2) including a second counter shaft (C21) supported rotatably about a second counter axis (X52) parallel to the carrier axis (X1), and a second counter gear (C22) that meshes with the transmission gear (91) and rotates integrally with the second counter shaft (C21), and an output gear (CK) that meshes with at least one of a gear that rotates integrally with the first counter shaft (C11) and a gear that rotates integrally with the second counter shaft (C21) and that rotates integrally with the output member (4), the output member (4) is supported rotatably about an output axis (X4) parallel to the carrier axis (X1), and a moment of inertia of a member rotating about the carrier axis (X1) and a member rotating about the output axis (X4), and a moment of inertia of a member rotating about the first counter axis (X51) and a member rotating about the second counter axis (X52) are configured to cancel each other.

According to the configuration, it is possible to effectively reduce the vibration caused by a torque fluctuation due to a combustion cycle or the like of the reciprocating internal combustion engine (10).

In the reciprocating internal combustion engine (10), a generator (MG) is drivingly coupled to the output member (4), and a gear ratio between the output gear (CK) and a gear that meshes with the output gear (CK) is set such that a rotational speed of the output member (4) is faster than rotational speeds of the first counter shaft (C11) and the second counter shaft (C21).

According to the configuration, the rotational speed of the generator (MG) is easily increased with respect to the rotational speed of the carrier (CR) of the reciprocating internal combustion engine (10). Therefore, it is easy to achieve reduction in size and high efficiency of the generator (MG).

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A reciprocating internal combustion engine comprising:
a planetary gear mechanism including a ring gear that is an internal gear, a carrier that is rotatably supported with respect to the ring gear, and a planetary gear that is rotatably supported with respect to the carrier and meshes with the ring gear;
a crank member coupled to the planetary gear to rotate integrally with the planetary gear, with a direction along a carrier axis which is a rotation axis of the carrier being defined as an axial direction, a direction orthogonal to the carrier axis being defined as a radial direction, and a direction orthogonal to a planetary axis which is a rotation axis of the planetary gear being defined as a planetary radial direction;
a piston member coupled to the crank member to be relatively rotatable about an input axis set at a position separately from the planetary axis in the planetary radial direction; and
a transmission mechanism configured to transmit a rotation of the carrier to an output member, wherein
a radius of the ring gear is twice a radius of the planetary gear,
a pair of planetary bearings are disposed separately on both sides of the planetary gear in the axial direction to rotatably support the planetary gear with respect to the carrier,
a pair of carrier bearings are disposed separately on both sides of the ring gear in the axial direction to rotatably support the carrier with respect to the ring gear,
the crank member includes a first crank portion and a second crank portion which are a pair of crank portions disposed separately on both sides of the carrier in the axial direction,
the piston member includes a piston body and a pair of coupling portions including a first coupling portion and a second coupling portion that are coupled to the piston body and disposed separately on both sides of the carrier in the axial direction,
the first crank portion and the second crank portion are disposed to extend in the planetary radial direction,
the first coupling portion is coupled to the first crank portion to be relatively rotatable about the input axis, and
the second coupling portion is coupled to the second crank portion to be relatively rotatable about the input axis.

2. The reciprocating internal combustion engine according to claim 1, wherein
the radius of the planetary gear is equal to a distance between the planetary axis and the input axis in the planetary radial direction, and
the first coupling portion and the second coupling portion are integrally coupled to the piston body.

3. The reciprocating internal combustion engine according to claim 2, wherein
a direction in which the piston body reciprocates is defined as a reciprocating direction,
the first coupling portion and the second coupling portion are integrally coupled to the piston body via an intermediate coupling portion,
the intermediate coupling portion includes an axial coupling portion that couples the first coupling portion and the second coupling portion in the axial direction, and a reciprocating direction coupling portion that couples the axial coupling portion and the piston body in the reciprocating direction,
a dimension of the axial coupling portion in the axial direction is larger than a dimension of the piston body in the axial direction, and
the reciprocating direction coupling portion is formed such that a cross section orthogonal to the reciprocating direction is smaller than that of the piston body.

4. The reciprocating internal combustion engine according to claim 1, wherein
the transmission mechanism includes a transmission gear that rotates integrally with the carrier, and an output gear that meshes with the transmission gear and rotates integrally with the output member,
the output gear and the output member are rotatably supported about an output axis parallel to the carrier axis, and
the transmission gear and the output gear are disposed between the pair of carrier bearings in the axial direction.

5. The reciprocating internal combustion engine according to claim 4, further comprising:
a pair of reciprocating units, each of the reciprocating units being a set of the planetary gear mechanism, the crank member, and the piston member, wherein
the transmission mechanism includes a pair of the transmission gears,
one of the pair of the transmission gears is a first transmission gear that rotates integrally with the carrier of one of the pair of reciprocating units,
the other of the pair of the transmission gears is a second transmission gear that rotates integrally with the carrier of the other of the pair of reciprocating units,
the output gear meshes with both the first transmission gear and the second transmission gear, and
the output axis is disposed at a position different from a line connecting the carrier axes of the pair of reciprocating units as viewed in the axial direction.

6. The reciprocating internal combustion engine according to claim 4, further comprising:

a pair of reciprocating units disposed side by side in the axial direction, each of the reciprocating units being a set of the planetary gear mechanism, the crank member, and the piston member, wherein the transmission mechanism includes a pair of the transmission gears and a pair of the output gears, one of the pair of the transmission gears is a first transmission gear that rotates integrally with the carrier of one of the pair of reciprocating units, the other of the pair of the transmission gears is a second transmission gear that rotates integrally with the carrier of the other of the pair of reciprocating units, one of the pair of the output gears is a first output gear that meshes with the first transmission gear, the other of the pair of the output gears is a second output gear that meshes with the second transmission gear, and the first output gear and the second output gear are disposed side by side on the output axis in the axial direction, and are each coupled to the output member to rotate integrally with the output member.

7. The reciprocating internal combustion engine according to claim 1, wherein the transmission mechanism includes a transmission gear that rotates integrally with the carrier, and an output gear that meshes with the transmission gear and rotates integrally with the output member, the output member includes a first counter gear that is rotatably supported about an output axis parallel to the carrier axis and rotates integrally with the output member, a counter mechanism including a counter shaft rotatably supported about a counter axis parallel to the carrier axis and a second counter gear that meshes with the first counter gear and rotates integrally with the counter shaft is further provided, when a direction in which the piston body reciprocates is defined as a reciprocating direction, a direction orthogonal to the reciprocating direction and the axial direction is defined as a width direction, one side of the width direction is defined as a width direction first side, and the other side is defined as a width direction second side, and an axis passing through a center of the piston body as viewed in the reciprocating direction and along the reciprocating direction is defined as a reciprocating drive axis, the output axis is disposed on the width direction first side and the counter axis is disposed on the width direction second side with the reciprocating drive axis interposed therebetween, and the first counter gear and the second counter gear are each a counter weight integrated gear in which a counter weight is integrally provided with the gear.

8. The reciprocating internal combustion engine according to claim 7, further comprising:

a first counter weight configured to rotate integrally with the output member; and a second counter weight configured to rotate integrally with the counter shaft independently of the first counter weight, wherein the first counter gear and the first counter weight are separately disposed on both sides of the reciprocating drive axis and the output gear in the axial direction, and the second counter gear and the second counter weight are separately disposed on both sides of the reciprocating drive axis in the axial direction.

9. The reciprocating internal combustion engine according to claim 1, wherein the transmission mechanism includes a transmission gear that rotates integrally with the carrier, and an output gear that meshes with the transmission gear and rotates integrally with the output member, the output member is rotatably supported about an output axis parallel to the carrier axis, and a counter mechanism including a counter shaft rotatably supported about a counter axis parallel to the carrier axis and a counter gear that meshes with the transmission gear and rotates integrally with the counter shaft is further provided, and the transmission gear, the output gear, and the counter gear are each a counter weight integrated gear in which a counter weight is integrally provided with the gear.

10. The reciprocating internal combustion engine according to claim 9, wherein a direction in which the piston body reciprocates is defined as a reciprocating direction, a direction orthogonal to the reciprocating direction and the axial direction is defined as a width direction, one side of the width direction is defined as a width direction first side, and the other side is defined as a width direction second side, the output axis is disposed on the width direction first side with respect to the carrier axis and is positioned at the same position in the reciprocating direction as the carrier axis or at a position on a piston body side with respect to the carrier axis in the reciprocating direction, the counter axis is disposed on the width direction second side with respect to the carrier axis and is positioned at the same position in the reciprocating direction as the carrier axis or at a position on the piston body side with respect to the carrier axis in the reciprocating direction, and the transmission gear, the output gear, and the counter gear are disposed to be positioned between the first coupling portion and the second coupling portion in the axial direction.

11. The reciprocating internal combustion engine according to claim 1, wherein the transmission mechanism includes a transmission gear that rotates integrally with the carrier, a first counter mechanism including a first counter shaft that is supported rotatably about a first counter axis parallel to the carrier axis, and a first counter gear that meshes with the transmission gear and rotates integrally with the first counter shaft, a second counter mechanism including a second counter shaft that is supported rotatably about a second counter axis parallel to the carrier axis, and a second counter gear that meshes with the transmission gear and rotates integrally with the second counter shaft, and an output gear configured to mesh with at least one of a gear that rotates integrally with the first counter shaft and a gear that rotates integrally with the second counter shaft and rotate integrally with the output member, the output member is supported rotatably about an output axis parallel to the carrier axis, and a moment of inertia of a member rotating about the carrier axis and a member rotating about the output axis, and a moment of inertia of a member rotating about the first counter axis and a member rotating about the second counter axis are configured to cancel each other out.

12. The reciprocating internal combustion engine according to claim 11, wherein a generator is drivingly coupled to the output member, and a gear ratio between the output gear and a gear that meshes with the output gear is set such that a rotational speed of the output member is faster than rotational speeds of the first counter shaft and the second counter shaft.

\* \* \* \* \*